(12) United States Patent
Song et al.

(10) Patent No.: US 11,943,362 B2
(45) Date of Patent: Mar. 26, 2024

(54) SYSTEM AND METHOD FOR PROVIDING PERSONAL INFORMATION USING ONE TIME PRIVATE KEY BASED ON BLOCKCHAIN OF PROOF OF USE

(71) Applicants: Sung-Un Song, Seoul (KR); Jin-Wook Jung, Seoul (KR)

(72) Inventors: Sung-Un Song, Seoul (KR); Jin-Wook Jung, Seoul (KR)

(*) Notice: Subject to any disclaimer, the term of this patent is extended or adjusted under 35 U.S.C. 154(b) by 420 days.

(21) Appl. No.: 17/239,183

(22) Filed: Apr. 23, 2021

(65) Prior Publication Data

US 2021/0243028 A1 Aug. 5, 2021

Related U.S. Application Data

(63) Continuation of application No. PCT/KR2019/013718, filed on Oct. 18, 2019.

(30) Foreign Application Priority Data

Oct. 31, 2018 (KR) .................. 10-2018-0131797

(51) Int. Cl.
*H04L 9/32* (2006.01)
*H04L 9/08* (2006.01)
(Continued)

(52) U.S. Cl.
CPC .......... *H04L 9/3228* (2013.01); *H04L 9/0822* (2013.01); *H04L 9/0825* (2013.01);
(Continued)

(58) Field of Classification Search
CPC ... H04L 9/3228; H04L 9/0822; H04L 9/0825; H04L 9/14; H04L 9/3218; H04L 9/50
See application file for complete search history.

(56) References Cited

U.S. PATENT DOCUMENTS 9,780,950 B1 * 10/2017 Dundas ............... H04L 9/08
2017/0330179 A1 * 11/2017 Song ................. G06Q 20/3823
(Continued)

FOREIGN PATENT DOCUMENTS

EP          3509006 A1 *  7/2019  ............ G06F 21/62
KR    10-2006-0112295 A    10/2006
(Continued)

OTHER PUBLICATIONS

International Search Report issued in PCT/KR2019/013718; dated Feb. 5, 2020.

*Primary Examiner* — Darshan I Dhruv
(74) *Attorney, Agent, or Firm* — Studebaker & Brackett PC

(57) ABSTRACT

The present disclosure relates to a system and a method for providing personal information for an online service system. More particularly, the present disclosure relates to a system and a method for providing personal information using a one-time private key based on a blockchain of proof of use, wherein personal information is registered and stored in a distributed manner in a blockchain network, services in online and offline service systems are used by using alternative authentication identification information that is anonymous and includes a public key to access the personal information in the blockchain network, and for membership registration and login, only the alternative authentication identification information is used to receive a service, become a member of a service, and to log in, without providing the personal information.

19 Claims, 8 Drawing Sheets

(51) Int. Cl.
   *H04L 9/14* (2006.01)
   *H04L 9/00* (2022.01)
(52) U.S. Cl.
   CPC .............. *H04L 9/14* (2013.01); *H04L 9/3218* (2013.01); *H04L 9/50* (2022.05)

(56) References Cited

U.S. PATENT DOCUMENTS

| | | | |
|---|---|---|---|
| 2018/0007037 A1* | 1/2018 | Reese | H04L 63/0838 |
| 2018/0205725 A1* | 7/2018 | Cronkright | H04L 63/0838 |

FOREIGN PATENT DOCUMENTS

| | | | |
|---|---|---|---|
| KR | 10-1590076 B1 | 2/2016 |
| KR | 10-1723405 B1 | 4/2017 |
| KR | 10-1793409 B1 | 11/2017 |
| KR | 10-1868029 B1 | 6/2018 |

\* cited by examiner

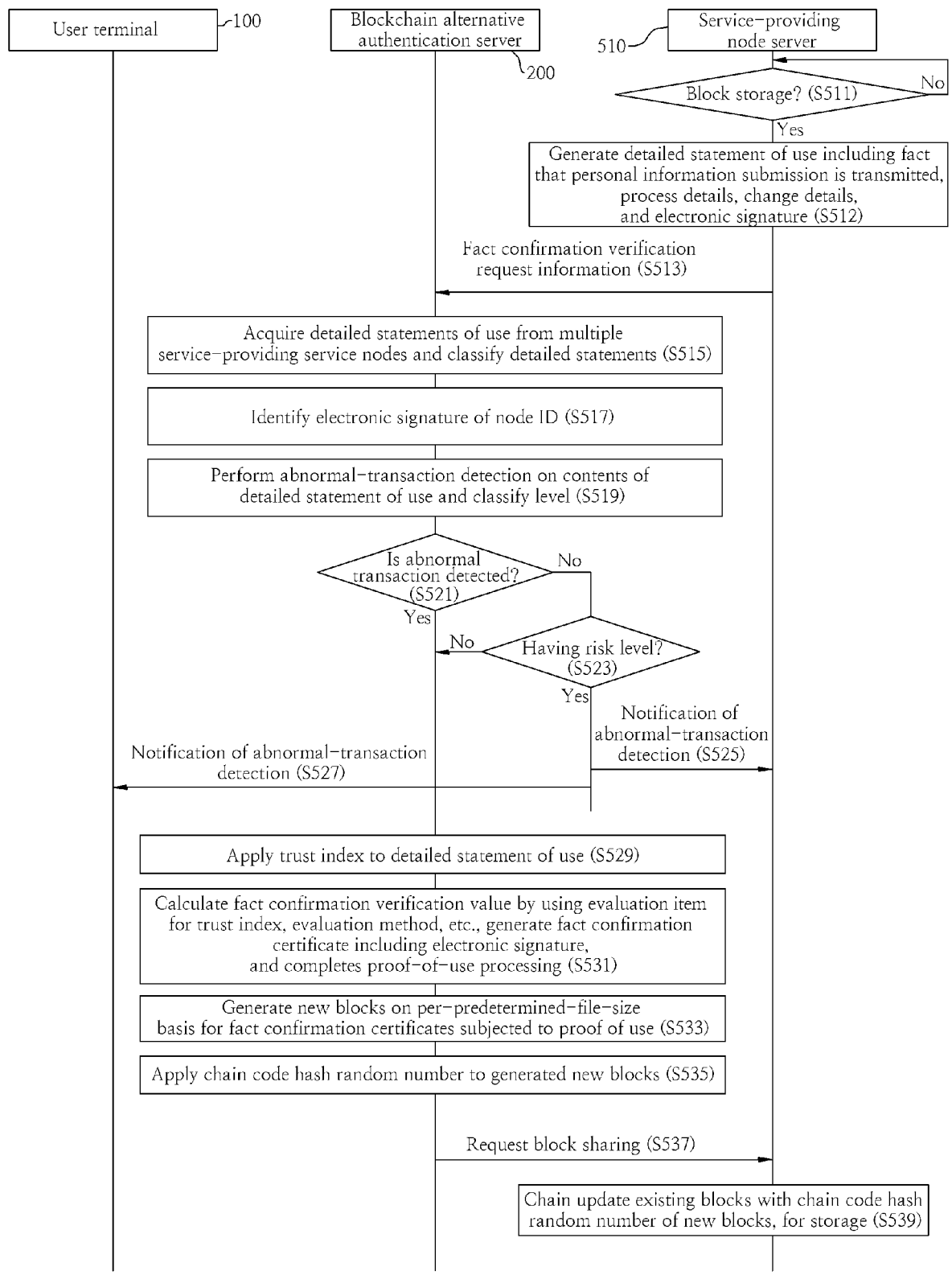

SYSTEM AND METHOD FOR PROVIDING PERSONAL INFORMATION USING ONE TIME PRIVATE KEY BASED ON BLOCKCHAIN OF PROOF OF USE

CROSS-REFERENCE TO RELATED APPLICATIONS

The present application is a continuation of International Patent Application No. PCT/KR2019/013718, filed Oct. 18, 2019, which is based upon and claims the benefit of priority to Korean Patent Application No. 10-2018-0131797 filed on Oct. 31, 2018. The disclosures of the above-listed applications are hereby incorporated by reference herein in their entirety.

TECHNICAL FIELD

The present disclosure relates to a system and a method for providing personal information for online and offline service systems. More particularly, the present disclosure relates to a system and a method for providing personal information using a one-time private key based on a blockchain of proof of use, wherein personal information is registered and stored in a distributed manner in a blockchain network, services in online and offline service systems are used by using alternative authentication identification information that is anonymous and includes a public key to access the personal information in the blockchain network, and for membership registration and login, only the alternative authentication identification information is used to receive a service, become a member of a service, and to log in, without directly providing the personal information.

BACKGROUND ART

As the Internet is used in a daily life, most people are provided with a number of online services through the Internet, for example, government agency services, educational institution services, medical institution services, telecommunications company services, financial company services, transportation company services, asset management, credit information services, portal services, social networking services (SNSs), games, shopping, ticketing, delivery services, electronic voting, etc.

A user who wants to use such services needs to input his or her real name and personal information to join as a member, or needs to input and register personal information for using the services as a non-member.

Usually, according to the types of online services, the personal information may include the following: personal unique identification information including a name, a birth date, a nationality, a sex of the user, etc.; personal alternative identification information including a phone number, an address, an email address, an SNS account, a terminal ID, a bank account number, etc.; and sensitive information including medical and pharmaceutical records, academic records, information on assets under a name, credit status information, military records, ticketing records, workplaces, marital status, family relations, association and labor union joining status, political orientation, religious orientation, genetic and biometric recognition information, sexual orientation, criminal records, etc. Usually, at least either the personal unique identification information or personal alternative identification information or both are included, and the sensitive information may be optionally included according to the types of services.

The pieces of the personal information registered as described above are provided to third parties after notification by service providers (SPs), but the users are unaware who uses their personal information, as well as when, for what, how, and why their personal information is used.

In addition, the users use many online services so it is difficult to log in one by one and monitor the use of the personal information.

In addition, the sensitive information is information provided for the optimal service to the user, so the sensitive information needs to be continuously updated to be effectively used. However, input and storage standards of pieces of the sensitive information are different and updating and sharing processes are very complicated or difficult.

In addition, when the user logs in as an online service member or a non-member, the user needs to input a login account or personal information. Therefore, there is a risk that the personal information may be incorrectly input, or leaked and stolen because of hacking, hooking, etc. during the process of inputting the personal information and service provider's handling and storing conditions of the personal information.

As described above, in order to use a service, each time the user registers and logs in, the personal information needs to be input and registered in a service system, so there is a risk that the personal information may be leaked when the personal information is input.

It is impossible to know who uses the personal information registered in the service system, as well as when, where, for what, how, and why the personal information is used. In particular, sensitive information of individuals is created and managed by a personal-information user, such as a service provider, but systematic responses are lukewarm to rights such as confirmation of prior consent from the subject of the personal information, for example, individuals, or a later request for deletion. In addition, handling and management standards differ between personal-information users, so it is difficult to provide or share the information to or with a third party.

In addition, there is a problem that it is difficult to verify and maintain the reliability of the personal information itself including updated sensitive information.

DISCLOSURE

Technical Problem

Accordingly, the present disclosure is directed to providing a system and a method for providing personal information using a one-time private key based on a blockchain of proof of use, wherein nodes participating in a blockchain network record, store, use, and manage personal information collected in servers or terminals (hereinafter, referred to as "service-providing node servers") of the nodes, and by using only alternative authentication identification information that is anonymous and includes a public key for accessing the personal information in the blockchain network without providing the personal information to various online and offline service systems, the required personal information is provided through the blockchain network, whereby members as well as non-members are able to use services, or it is easy to become a member of a service and to log in.

Technical Solution

According to the present disclosure, there is provided a system for providing personal information using a one-time private key based on a blockchain of proof of use, the system including: a user terminal storing a public key and a private key, and transmitting one-time private key issue request information including user-authentication information and terminal identification information when a request for required personal information field information is made in response to a service use request; a blockchain network including multiple service-providing node servers that are configured to store a personal information transaction statement encrypted with the public key of any user terminal in a distributed manner; when a first one-time private key and a second one-time private key for any personal information transaction statement are received and the first one-time private key and the second one-time private key are in a pair, extract the personal information for a required personal information field that is requested, by decrypting the personal information transaction statement with the second one-time private key; and generate and issue a personal information submission including the extracted personal information for the required personal information field; a service provider server configured to make the request for the required personal information field information to the user terminal in response to the service use request; receive the first one-time private key; transmit personal information provision request information including the first one-time private key to the service-providing node server of a service-providing node server access address that is received when the first one-time private key is issued; and receive, in response thereto, the personal information submission from the service-providing node server in the blockchain network to acquire the personal information; and a blockchain alternative authentication server configured to store the user-authentication information and the terminal identification information for the user terminal, and a node transmission log including information on the service-providing node server storing the personal information transaction statement for a user of the user terminal; generate the first one-time private key and the second one-time private key in a pair when the one-time private key issue request information is received from the user terminal; transmit the first one-time private key to the service provider server from which the user terminal is to receive a service; and provide the second one-time private key to the service-providing node server in the blockchain network having the personal information transaction statement for the user of the user terminal, on the basis of the node transmission log.

The user terminal may be configured to transmit blockchain alternative authentication service registration request information to the blockchain alternative authentication server; when the blockchain alternative authentication server requests user-identification personal information correspondingly, provide the blockchain alternative authentication server with the user-identification personal information acquired; when the blockchain alternative authentication server makes a request for the user-authentication information, acquire the user-authentication information and the terminal identification information of the user terminal and transmit the same to the blockchain alternative authentication server; and receive alternative authentication keys including the public key and the private key from the blockchain alternative authentication server and store the alternative authentication keys for registration for a blockchain alternative authentication service; and the blockchain alternative authentication server may be configured to provide the user-identification personal information to a user-identification institution server to request user authentication; by applying a user-identification result value corresponding thereto and the user-authentication information received from the user terminal, generate the alternative authentication keys including the public key and the private key and provide the same to the user terminal; select multiple nodes in which the personal information transaction statement for the user of the user terminal is to be stored; and encrypt the personal information transaction statement, which is a record of the personal information received through the user terminal, with the public key; and store the encrypted personal information transaction statement in a plurality of the service-providing node servers for the selected nodes in a distributed manner for registration.

The blockchain alternative authentication server may randomly select the nodes that are two to 50% of all the nodes, and store the personal information transaction statement encrypted with the public key in the service-providing node servers corresponding to the selected nodes in a distributed manner.

The blockchain alternative authentication server may delete the public key, the private key, and the personal information transaction statement that are generated and provided over the blockchain network.

The service provider server may be the service-providing node server belonging to the blockchain network, and after the personal information is acquired, when any one or more of addition, deletion, and modification of the personal information for the user of the user terminal occur as the service is provided, the service-providing node server may generate the personal information submission including an electronic signature of the service-providing node server, perform encryption using an encryption key and a reply address of the service-providing node server that has provided the personal information, and transmit the encrypted personal information to the service-providing node server, so that the personal information for the user of the user terminal is updated.

The blockchain alternative authentication server may be configured to generate a fact confirmation certificate for the personal information transaction statement stored in a distributed manner, to complete proof of use; generate new blocks on a per-predetermined-file-size basis; and perform chaining with existing blocks and a hash random number.

The user terminal may include: a wireless communication unit performing data communication with the service provider server and the blockchain alternative authentication server over a wired/wireless data communication network; a display unit; an input unit; a biometric recognition information detection unit detecting and outputting biometric information of the user; and a terminal control unit configured to transmit the one-time private key issue request information and the blockchain alternative authentication service registration request information to the blockchain alternative authentication server through the wireless communication unit; acquire the user-identification personal information through the display unit and the input unit when the user-identification personal information is requested correspondingly and provide the user-identification personal information to the blockchain alternative authentication server; when either the request for the user-authentication information from the blockchain alternative authentication server or the request for the required personal information field information is made, acquire the biometric information through the biometric recognition information detection unit, acquire a personal identification number (PIN) through the display unit and the input unit, and acquire the user-authentication information including the biometric information and the personal identification number; transmit the acquired user-authentication information and the acquired terminal identification information to the blockchain alternative authentication server through the wireless communication unit; and receive the alternative authentication keys including the public key and the private key from the blockchain alternative authentication server and store the alternative authentication keys for registration for the blockchain alternative authentication service.

The biometric recognition information detection unit may include one or more of the following: a fingerprint detection unit detecting and outputting fingerprint information of a finger of the user; an iris detection unit outputting iris information from an iris of the user; a voice feature detection unit outputting voice feature information of a voice of the user; a face recognition detection unit outputting face feature information of a face of the user; and an action recognition detection unit outputting action feature information of at least one among a signature, an input pattern, and a gesture of the user.

An alternative authentication key including at least one among the private key and the public key may be a hash random number and may be provided in a form of a QR code.

According to the present disclosure, there is provided a method for providing personal information using a one-time private key based on a blockchain of proof of use, the method including: a user-authentication and terminal-authentication process in which when in response to a service use request to a service provider server, personal information request information is generated from the service provider server, a blockchain alternative authentication server receives one-time private key issue request information including user-authentication information and terminal identification information from a user terminal storing alternative authentication keys including a public key and a private key, performs user authentication and terminal authentication, and provides a result thereof to the user terminal; a one-time private key issue request reception process in which when the user authentication and the terminal authentication succeed, the blockchain alternative authentication server receives the one-time private key issue request information including the alternative authentication keys including the public key and the private key from the user terminal; a one-time private key provision process in which when the blockchain alternative authentication server receives the one-time private key issue request information from the user terminal, the blockchain alternative authentication server generates a first one-time private key and a second one-time private key in a pair, transmits the first one-time private key to the service provider server, and provides a service-providing node server in a blockchain network having a personal information transaction statement for a user of the user terminal with the second one-time private key on the basis of a node transmission log including service provider information for the service-providing node server storing the personal information transaction statement for the user of the user terminal; a personal information request process in which the service provider server receives the first one-time private key, and transmits personal information provision request information including the first one-time private key to the service-providing node server in the blockchain network; a personal information provision process in which the service-providing node server performs authentication on whether the second one-time private key received from the blockchain alternative authentication server and the first one-time private key of the personal information provision request information transmitted by the service provider server are in a pair, and when authentication succeeds, the service-providing node server decrypts the personal information transaction statement for the user terminal of the personal information provision request information with the second one-time private key, generates a personal information submission including the personal information including information on a required personal information field required by the service provider server, and provides the personal information submission to the service provider server; and a service provision process in which the service provider server receives the personal information submission for the user terminal from the service-providing node server, acquires the personal information including the required personal information field, and provides a service to the user terminal.

The method may further include: an alternative authentication service registration process in which the blockchain alternative authentication server is configured to receive blockchain alternative authentication service registration request information from the user terminal; make a request to the user terminal for user-identification personal information; perform user identification through a user-identification institution server when the user-identification personal information is received; acquire the user-authentication information and the terminal identification information from the user terminal when user identification succeeds; perform user authentication and terminal authentication; generate the alternative authentication keys including the public key and the private key when authentication succeeds; provide the alternative authentication keys to the user terminal for storage; and register the user terminal for a blockchain alternative authentication service.

The alternative authentication service registration process may include: a service registration request step in which the user terminal accesses the blockchain alternative authentication server and transmits the blockchain alternative authentication service registration request information to request registration for the blockchain alternative authentication service; a user-identification step in which when a blockchain alternative authentication service registration request is made from the user terminal, the blockchain alternative authentication server acquires the user-identification personal information from the user terminal, makes a request to the user-identification institution server for user identification, and acquires a user-identification result value; a user-authentication information request step in which after user identification, the blockchain alternative authentication server makes a request to the user terminal for registration of the user-authentication information; a user-authentication information provision step in which when the request for the user-authentication information is made from the blockchain alternative authentication server, the user terminal acquires the user-authentication information from the user and transmits the user-authentication information to the blockchain alternative authentication server; an alternative authentication key provision step in which the blockchain alternative authentication server generates the alternative authentication keys including the private key and the public key by applying the user-identification result value and any one or more among the registered user-authentication information and a token variable value, and provides the alternative authentication keys to the user terminal; a personal information acquisition step in which the blockchain alternative authentication server acquires the personal information from the user terminal; a personal information transaction statement registration step in which when the personal information is acquired, the blockchain alternative authentication server is configured to select multiple nodes in which the personal information is to be stored among nodes in the blockchain network; generate the personal information transaction statement including the personal information and encrypt the personal information transaction statement with the public key; store the personal information transaction statement and the public key in the service-providing node servers for the selected nodes in a distributed manner; and generate and store node transmission log information including information on the nodes storing blocks; and a block update chain step in which the blockchain alternative authentication server performs proof of use on a fact confirmation certificate for the registered personal information transaction statement, generates new blocks, and applies a chain code hash random number to form an update chain for existing blocks stored in all the nodes.

The alternative authentication service registration process may further include: a user information deletion step in which the blockchain alternative authentication server is configured to issue the generated alternative authentication keys including the public key and the private key, and the personal information transaction statement to the user terminal; transmit the generated personal information transaction statement to the selected service-providing node servers for distributed storage; and delete the personal information transaction statement.

When selecting the nodes to store blocks including the personal information transaction statement, the blockchain alternative authentication server may randomly select the nodes of which the number ranges from two to 50% of the total number of the nodes in the blockchain network.

The user-authentication and terminal-authentication process may include: a service use request step in which the user terminal accesses the service provider server and transmits service use request information including the public key; a personal information input request step in which the service provider server transmits, to the user terminal, personal information input request information including required personal information field information and the service provider information including service provider identification information, an encryption key, and a reply address; a user-authentication request step in which the user terminal acquires the user-authentication information when the personal information input request information is received, and transmits the acquired user-authentication information and the terminal identification information to the blockchain alternative authentication server to request user authentication; and a user-authentication and terminal-authentication performance step in which the blockchain alternative authentication server performs user authentication and terminal authentication with the user-authentication information and the terminal identification information.

The personal information provision process may include: a one-time private key reception step in which the service-providing node server in the blockchain network receives the second one-time private key and a personal information request statement including the public key, the service provider information, required personal information field information, and one-time private key pair authentication information from the blockchain alternative authentication server, and receives the first one-time private key and the service provider information including service provider identification information of a service provider, an encryption key, and a reply address from the service provider server; a service provider identification information verification step in which it is verified whether pieces of the service provider identification information of the service provider are matched, on the basis of the received service provider information and the personal information request statement; a personal information transaction statement detection step in which when verification of the service provider identification information succeeds, the personal information transaction statement matched to the public key is detected; an authentication step in which against the one-time private key pair authentication information, authentication is performed on whether the first one-time private key and the second one-time private key are in a pair, and when pair authentication succeeds, the second one-time private key is activated to be used as the one-time private key; a personal information transaction statement decryption step in which the personal information transaction statement for the user terminal is decrypted with the authenticated one-time private key; and a personal information provision step in which the personal information corresponding to the required personal information field information is extracted from the decrypted personal information transaction statement, the personal information submission including the extracted personal information corresponding to the personal information field is generated, an electronic signature of the service provider server is added, encryption is performed with the encryption key of the service provider, and a result of encryption is provided to the service provider server corresponding to the service provider identification information.

The method may further include: an update process in which when the service provider server is the service-providing node server belonging to the blockchain network and the service-providing node server identifies occurrence of change of the personal information including sensitive personal information as the service for the user of the user terminal is provided, the service-providing node server generates a personal information submission document including both the personal information including the sensitive personal information to be changed and an electronic signature of the service-providing node server, and makes a reply to the service-providing node server that has provided the personal information, so that the personal information for the user of the user terminal is updated.

The update process may include: a monitoring step in which the service-providing node server monitors whether the personal information including the sensitive personal information to be changed as the service for the user of the user terminal is provided is generated; an update agreement inquiry step in which the service-providing node server transmits change-details-informing and agreement inquiry information to the user terminal in order to inform of a record of details of change of the personal information including the sensitive personal information to be changed and to inquire about agreement on update storage, thereby inquiring about agreement on update; a personal information submission document generation step in which when an update agreement signal is received from the user terminal, the service-providing node server generates the personal information submission document including the public key and the electronic signature of the service-providing node server with respect to the personal information including the sensitive personal information to be changed; a first one-time private key provision step in which when an agreement signal is received from the user terminal, the service-providing node server makes a request to the user terminal for the one-time private key, receives the first one-time private key from the user terminal, and transmits the first one-time private key to the service-providing node server that has provided the personal information; and an update request step in which the service-providing node server encrypts the generated personal information submission document with an encryption key of the service-providing node server that has provided the personal information, and transmits personal information change request information with the first one-time private key to a reply address of the service-providing node server that has provided the personal information.

The update process may further include: a one-time private key request step in which to update the detected personal information transaction statement matched to a user public key, the service-providing node server that has requested the personal information transmits, to the user terminal, one-time private key issue request information for making a request to the user terminal for the one-time private key one more time in order to decrypt the personal information transaction statement encrypted with the user public key; a one-time public key provision step in which in response to a one-time private key issue request from the service-providing node server, when the one-time private key issue request information is received from the user terminal, the blockchain alternative authentication server generates the first one-time private key and the second one-time private key that are a one-time private key pair, provides the first one-time private key to the service-providing node server, and transmits the second one-time private key to the service-providing node server that has provided the personal information; and a chaining step in which the service-providing node server that has provided the personal information is configured to perform pair authentication on the received first one-time private key and the received second one-time private key; decrypt the personal information transaction statement; apply personal information change details included in the personal information submission document to an original text for change processing and storage; and generate a detailed statement of use, provide the same to the blockchain alternative authentication server to perform proof of use, and perform generation into blocks and chaining.

Advantageous Effects

According to the present disclosure, the personal information is stored in a service-providing node server participating in the blockchain network, and a detailed statement of use that is a record of use of the stored personal information inside and outside the blockchain network is finally subjected to proof of use and generation into blocks and sharing with all participating nodes for chaining. By using only alternative authentication keys, such as a user public key, a private key, etc., which has anonymity based on a blockchain and personal alternative identification information including user-authentication information and terminal identification information, online and offline services are used by non-members and becoming a member of offline and online services or login is performed. Therefore, a user does not need to keep the personal information or directly input and provide the same to a service provider, so safe and distributed storage of the personal information and the convenience of use can be enhanced. In addition, the personal information is prevented from being leaked or stolen for security because of user's direct storage or frequent input of the personal information.

In addition, according to the present disclosure, when the personal information in the blockchain network is used, the use is recorded so the use of the personal information is easily monitored and abnormal-transaction detection, such as illegal use of the personal information, records of errors, etc., and user's requests, such as agreement, correction, deletion, etc., are handled. That is, according to the present disclosure, the user as well as the blockchain network is able to monitor who uses the personal information of the user, as well as when, where, for what, and why the personal information is used, and is able to make requests, such as agreement, correction, deletion, etc.

In addition, according to the present disclosure, a multi-authentication channel method to which two or more among personal alternative authentication identification information using a user public key, terminal identification information (terminal ID) for terminal authentication, a personal identification number (PIN) for user authentication, biometric recognition information, etc. are applied is applied, which enhances convenience and security of the user terminal.

DESCRIPTION OF DRAWINGS

FIG. 8 is a flowchart illustrating a proof-of-use scheme of a blockchain alternative authentication server, in a method for providing personal information, in a system for providing personal information using a one-time private key based on a blockchain based on a proof of use according to the present disclosure.

BEST MODE

Hereinafter, a configuration and operation of a system for providing personal information using a one-time private key based on a blockchain of proof of use according to the present disclosure will be described in detail with reference to the accompanying drawings, and a method, in the system, for providing personal information using a one-time private key based on a blockchain of proof of use will be described.

Figure 1:
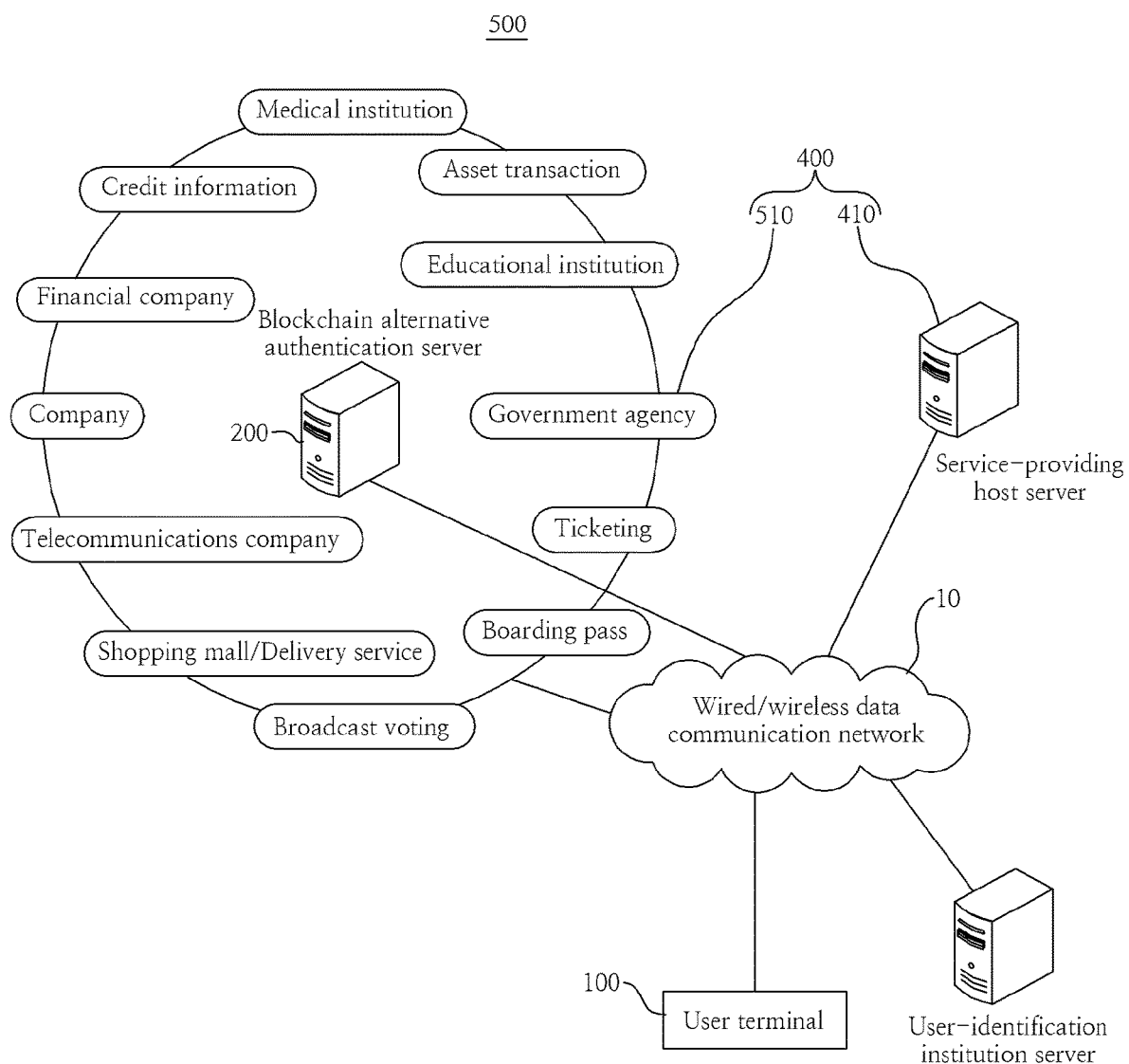
FIG. 1 is a diagram illustrating a configuration of a system for providing personal information using a one-time private key based on a blockchain of proof of use according to the present disclosure.

FIG. 1 is a diagram illustrating a configuration of a system for providing personal information using a one-time private key based on a blockchain of proof of use according to the present disclosure.

Referring to FIG. 1, a system for providing personal information using a one-time private key based on a blockchain of proof of use according to the present disclosure includes a user terminal 100, a blockchain alternative authentication server 200, a user-identification institution server 300, a service provider server 400, and a blockchain network 500.

The user terminal 100, the blockchain alternative authentication server 200, the user-identification institution server 300, the service provider server 400, and the blockchain network 500 are connected over a wired/wireless data communication network 10 in a wired/wireless manner to perform data communication with each other.

The wired/wireless data communication network 10 may be a data communication network in which at least one or more of the following networks are combined: a wide area network (WAN) including a Wi-Fi network; a mobile communication network, such as 3G (the third generation), 4G, 5G, etc.; Wibro networks, etc.

Preferably, the user terminal 100 is a mobile terminal, called a mobile phone, a smartphone, etc., having terminal identification information, but is not limited thereto. The user terminal 100 may be a desktop computer, a laptop computer, or the like having the terminal identification information. The terminal identification information may be a phone number, an electric serial number (ESN), the International Mobile Equipment Identity (IMEI), an Internet Protocol (IP) address, a MAC address, or the like. Preferably, the terminal identification information is unique information that does not change.

The user terminal 100 provides personal information, user-authentication information, and terminal identification information only once at the beginning in order to become a member of a blockchain alternative authentication service according to the present disclosure. The user terminal 100 receives alternative authentication keys including a public key, a private key, etc. issued and stores and keeps the same. The user terminal 100 accesses the service provider server 400 that provides any service and provides the service provider server 400 with the stored and kept public key that is anonymous for registration as a member to receive the service, login, and request for the service. The alternative authentication keys, such as a public key, a private key, etc., are hash random numbers, and may be provided as QR codes.

In addition, the user terminal 100 receives and displays information for requesting approval and confirmation, and receives a user's response thereto and provides the same to the corresponding configuration.

In addition, examples of the user terminal 100 may include a mobile terminal that provides an alternative authentication key for making a service use request, and a manager terminal of a service-providing host that is an offline external service provider or of a service-providing node that is an internal service provider. That is, in an offline manner, a mobile terminal provides a manager terminal with a public key that is called and displayed after user authentication and terminal authentication from the user, and the mobile terminal uses the received public key through the alternative authentication server 200 to verify the reliability of the public key and perform a use process and operation, such as a request for providing required personal information, and so on.

A configuration and operation of the user terminal 100 will be described later in detail with reference to FIG. 2.

The user-identification institution server 300 performs general user identification when user-identification request information is received from the blockchain alternative authentication server 200, and provides a user-identification result value (Duplication Information (DI)) according to a result of user identification.

The service provider server 400 may be either a service-providing node server 510 or a service-providing host server 410, wherein the service-providing node server 510 is a server of a service-providing node that is an internal service provider participating as a node in the blockchain network 500, and the service-providing host server 410 is a server of a service-providing host that is an external service provider not participating as a node in the blockchain network 500.

The service provider server 400 is a server installed in a government agency, an educational institution, a medical institution, a telecommunications company, a financial company, a transportation company, an asset management company, a credit information company, a portal company, a SNS, a game company, a shopping mall, a delivery company, a ticketing company, an electronic voting company, etc. The service provider server 400 receives personal information that is required by the service provider, through the blockchain network 500 by using an alternative authentication service that the alternative authentication server 200 provides.

In the case in which the service provider server 400 is the service-providing node server 510, the term server is used, but a terminal device, such as a mobile terminal, etc., may be used.

As the service provider server 400, the service-providing node server 510 receives and stores various types of personal information from users once at the beginning, and provides an appropriate service to a user and a service provider on the basis of the stored personal information. The service-providing host server 410 receives the personal information stored in the service-providing node server 510 and provides an appropriate service to a service provider. As described above, the personal information that the service provider server 400 uses may be classified into three types: personal unique identification information, personal alternative identification information, and sensitive personal information.

The personal unique identification information may be a name, a birth date, a sex, biometric information, a nationality, a photo, etc. The personal alternative identification information may be an address, a phone number, an email address, identification information (ID), a card number, a bank account number, location information, a cookie ID, a terminal ID, a MAC address, an IP address, IMEA, an advertisement identifier, etc. The sensitive personal information may be user's medical records, pharmaceutical records, academic records, information on assets under the name, military records, credit status information, ticketing records (air, ships, and trains), entry and exit records, licenses and qualifications, patents (application, registration, and maintenance), family relations, criminal records, labor union and association joining status, religion, political orientation, sexual orientation, etc.

According to the present disclosure, when the user terminal 100 provides a public key among the alternative authentication keys as service access information for using a service, the service provider server 400 makes a request to the user terminal 100 for personal information items (or referred to as "fields") required to access the service, and receives, from the blockchain alternative authentication server 200 accordingly, a first one-time private key and an access (or reply) address of the service-providing node server 510 from which personal information of the user of the user terminal 100 is provided.

When the first one-time private key and the node server access address are received, the service provider server 400 transmits personal information provision request information including the first one-time private key to the service-providing node server 510 of the node server access information, receives personal information, which includes a personal information field required to provide the service, of the user of the user terminal 100 from the service-providing node server 510, and provides the service accordingly.

As the service provider server 400, the service-providing node server 510 records a personal information transaction statement including changed personal information when the personal information including the sensitive personal information of the user makes a change, for example, deletion, addition, modification, etc. as the service is provided. After the service-providing node server 510 adds an electronic signature thereof, the service-providing node server 510 generates a detailed statement of use of the personal information transaction statement and transmits the same to the alternative authentication server, and the alternative authentication server 200 performs proof of use on the detailed statement. The personal information transaction statement for the personal information changed as described above may be distributed and stored in other multiple service-providing node servers 510 including the above-described service-providing node server 510.

The blockchain network 500 is composed of multiple nodes, that is, a plurality of the service-providing node servers 510, and is managed by the blockchain alternative authentication server 200 so that a personal information transaction statement and a user public key are distributed and stored in multiple service-providing node servers 510 selected by the blockchain alternative authentication server 200.

In addition, all the service-providing node servers 510 update an existing block, which is stored, with a new block for storage each time the new block is received from the alternative authentication server.

A service-providing node server 510-1 of a service-providing node, which is one of service providers, detects a personal information transaction statement matched to a user public key when personal information including sensitive personal information of a user who uses a user terminal 100 is changed during use of the personal information for providing a unique service. The service-providing node server 510-1 receives a one-time private key, performs pair authentication, decrypts the personal information transaction statement, and records the changed personal information. The service-providing node server 510-1 encrypts the changed personal information with a public key of the user terminal 100 and stores a personal information transaction statement encrypted with an electronic signature of the service-providing node server 510-1.

In the above description, a service-providing node server 510-2 that provides the personal information to the service-providing node server 510-1 receives a second one-time private key and a personal information request statement including service provider identification information from the blockchain alternative authentication server 200. The service-providing node server 510-2 receives service provider information and personal information provision request information including a first one-time private key from the service-providing node server 510-1, and compares the personal information request statement and the personal information provision request information to check the service provider information and a required personal information field. Next, while the personal information transaction statement that is stored is detected using the user public key, the service-providing node server 510-2 performs pair authentication on the first one-time private key and the second one-time private key and decrypts the personal information transaction statement encrypted with the public key of the user terminal 100 by using the second one-time private key. The service-providing node server 510-2 extracts the personal information corresponding to a required personal information field required by the service-providing node server 510-1 from the personal information transaction statement and generates a personal information submission. The personal information submission is encrypted using an encryption key included in the service provider identification information and is provided to the service-providing node server 510-2 of a reply address.

The blockchain alternative authentication server 200 generates alternative authentication keys, such as a public key, a private key, etc. unique to the user of the user terminal 100, and provides the alternative authentication keys to the user terminal 100. The blockchain alternative authentication server 200 generates a personal information transaction statement including the personal information received from the user terminal 100 and performs encryption with the public key. The encrypted personal information transaction statement and the public key are distributed and stored in the service-providing node servers 510 participating in the blockchain network 500.

When the blockchain alternative authentication server 200 receives a user public key, service provider information for receiving a service, a required personal information field, and one-time private key issue request information from any user terminal 100, the blockchain alternative authentication server 200 generates a first one-time private key and a second one-time private key in a pair, provides the first one-time private key to the service provider server 400, and provides the second one-time private key to the service-providing node server 510 to which the personal information is to be provided.

In addition, the blockchain alternative authentication server 200 performs proof of use (POU) on a detailed statement of use, which is a record of details of use of the personal information transaction statement stored in a distributed manner in the blockchain network 500, to generate one or more new blocks of a predetermined file size for a fact confirmation certificate including an electronic signature of the blockchain alternative authentication server 200, and forms an update chain with the existing blocks stored in all the service-providing node servers 510.

A detailed configuration of the blockchain alternative authentication server 200 will be described later with reference to FIG. 3.

Figure 2:
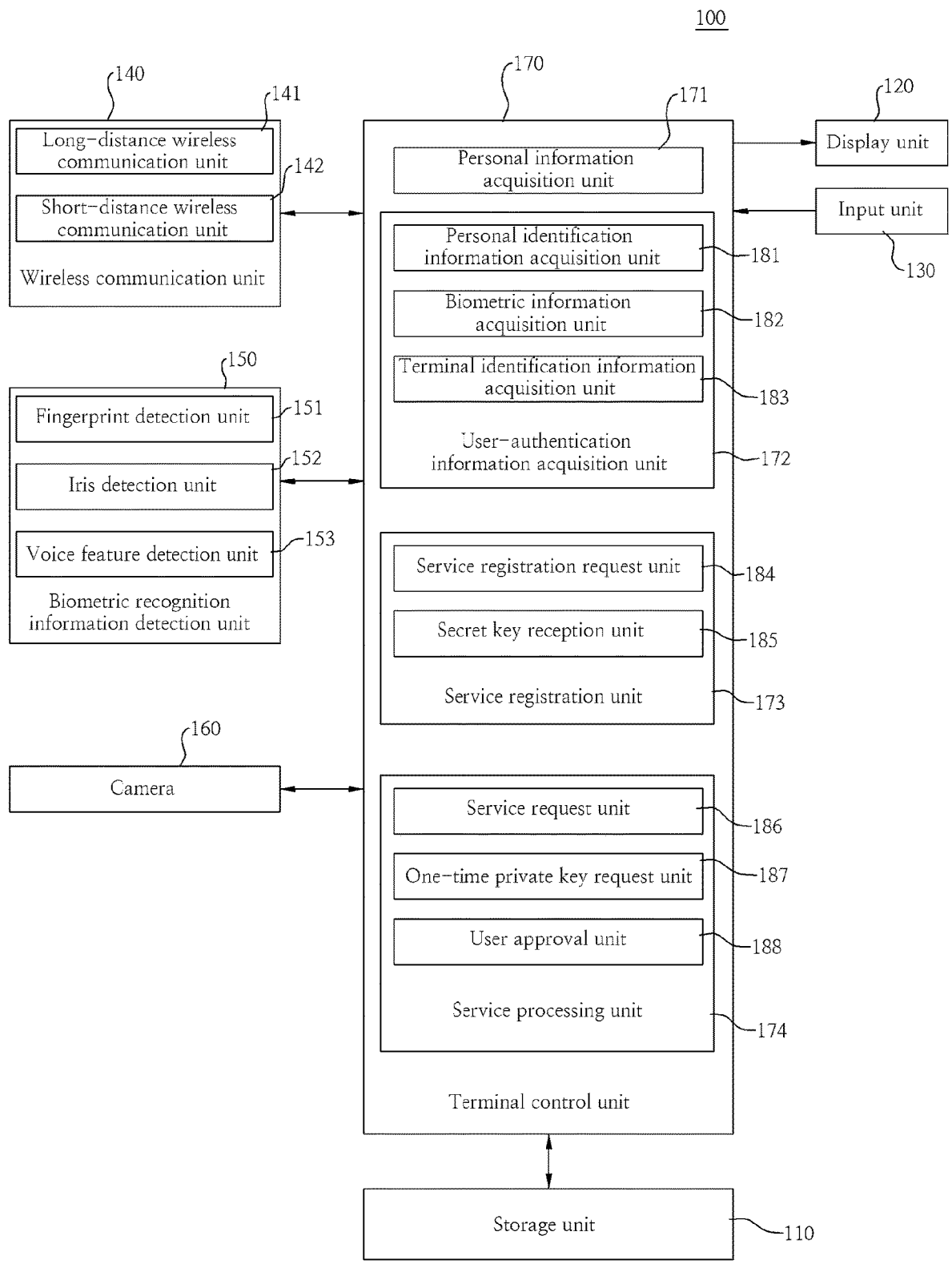
FIG. 2 is a diagram illustrating a configuration of a user terminal of a system for providing personal information using a one-time private key based on a blockchain of proof of use according to the present disclosure.

FIG. 2 is a diagram illustrating a configuration of a user terminal of a system for providing personal information using a one-time private key based on a blockchain of proof of use according to the present disclosure, wherein the user terminal is a mobile terminal.

Referring to FIG. 2, the user terminal 100 includes a storage unit 110, a display unit 120, an input unit 130, a wireless communication unit 140, a biometric recognition information detection unit 150, a camera 160, and a terminal control unit 170.

The storage unit 110 includes: a program area storing a control program for controlling the overall operation of the user terminal 100 according to the present disclosure; a temporary area temporarily storing data generated during the execution of the control program; and a data area semi-permanently storing data required or generated during the execution of the control program.

The data area may store alternative authentication keys, such as user's personal information, a public key, and a private key, a terminal identification information, etc. According to an embodiment, the data area may store biometric information (Fast Identity Online (FIDO)) and a personal identification number (PIN).

The display unit 120 displays various types of information including operation state information of the user terminal 100 into one or more among text, graphics, still images, videos, etc.

The input unit 130 includes at least one of the following: a key input device, such as a keyboard, a keypad, etc., for inputting multiple functions and letters; a button device including a power button, a volume button, a special function button, etc.; and a touch pad integrated with a screen of the display unit 120 and outputting position information that corresponds to a position that the user touches on the screen. The input unit 130 enables the user to input various commands and information.

The wireless communication unit 140 may include: a long-distance wireless communication unit 141 that is connected to the wired/wireless data communication network 10 in a wireless manner and performs data communication with other servers and devices connected to the wired/wireless data communication network 10; and a short-distance wireless communication unit 142 that is directly connected to other user terminals 100 or other devices a short distance away and performs data communication.

The long-distance wireless communication unit 141 may include at least one among a first long-distance wireless communication unit (not shown) capable of accessing a Wi-Fi network, and a second long-distance wireless communication unit (an LTE wireless communication unit, and a CDMA wireless communication unit, which are not shown) capable of accessing a mobile communication network.

The short-distance wireless communication unit 142 may include any one or more among radio-frequency identification (RFID), a Bluetooth wireless communication unit, and a short-distance wireless communication unit (Near Field Communication (NFC)).

The biometric recognition information detection unit 150 detects biometric information of the user of the user terminal 100 and outputs the same to the terminal control unit 170.

The biometric recognition information detection unit 150 includes at least one among the following: a fingerprint detection unit 151 detecting a fingerprint from a user's finger and outputting fingerprint information; an iris detection unit 152 detecting an iris from a user's eye and outputting iris information; and a voice feature detection unit 153 detecting a voice feature from a user's voice and outputting voice feature information. The biometric recognition information detection unit 150 may further include: a face recognition detection unit (not shown) detecting a feature from an acquired facial image and outputting facial feature information; and an action recognition detection unit (not shown) detecting an action feature according to user's action (for example, a walk, a signature, an input pattern, a gesture, etc.) and outputting action feature information.

The camera 160 photographs an object within the angle of view and outputs image data to the terminal control unit 170. According to the present disclosure, the camera 160 may photograph a QR code including a public key and output a result to the terminal control unit 170.

The terminal control unit 170 includes a personal information acquisition unit 171, a user-authentication information acquisition unit 172, a service registration unit 173, and a service processing unit 174, and controls the overall operation of the user terminal 100 according to the present disclosure.

The personal information acquisition unit 171 causes a personal information input user interface means to be displayed on the display unit 120 so that personal information described above is input, and acquires personal information through the displayed personal information input user interface means and the input unit 130.

The user-authentication information acquisition unit 172 includes: a personal identification information acquisition unit 181 causing the user-authentication information input user interface means to be displayed on the display unit 120, and receiving a personal identification number through the user-authentication information input user interface means displayed on the display unit 120 and the input unit 130; a biometric information acquisition unit 182 acquiring biometric information through the biometric recognition information detection unit 150; and a terminal identification information acquisition unit 183 acquiring terminal identification information from the storage unit 110.

The service registration unit 173 includes a service registration request unit 184 and an alternative authentication key reception unit 185. The service registration request unit 184 is configured to: access the blockchain alternative authentication server 200; make a blockchain alternative authentication service registration (use) request to the blockchain alternative authentication server 200; and acquire, when user-identification personal information and user-authentication information request information are received from the blockchain alternative authentication server 200 in response to the service registration request, personal information for user identification and user-authentication information through the personal information acquisition unit 171 and the user-authentication information acquisition unit 172, and transmit the same to the blockchain alternative authentication server 200. After the service registration request, the alternative authentication key reception unit 185 receives a public key and a private key that are alternative authentication keys from the blockchain alternative authentication server 200 and stores the keys in the storage unit 110.

The alternative authentication keys may be kept in an external storage device, as printouts, etc., depending on a user's method.

The service processing unit 174 includes a service request unit 186, a one-time private key request unit 187, and a user approval unit 188. The service request unit 186 is configured to: access the service provider server 400 and request a service to the service provider server 400; acquire user-authentication information through the user-authentication information acquisition unit 172 when personal information input request information for providing the service is received from the service provider server 400; and load a public key, a private key, and terminal identification information from the storage unit 110 and output the same. The one-time private key request unit 187 transmits, to the blockchain alternative authentication server 200, one-time private key issue request information including the alternative authentication keys, such as the user-authentication information, the public key, the private key, etc., and terminal identification information. The user approval unit 188 causes a notification to the service provider server 400, an approval inquiry, normal confirmation information, etc. to be displayed on the display unit 120 in response to the one-time private key issue request, and receives a user's response thereto through the input unit 130 and provides the same to the service provider server 400.

Figure 3:
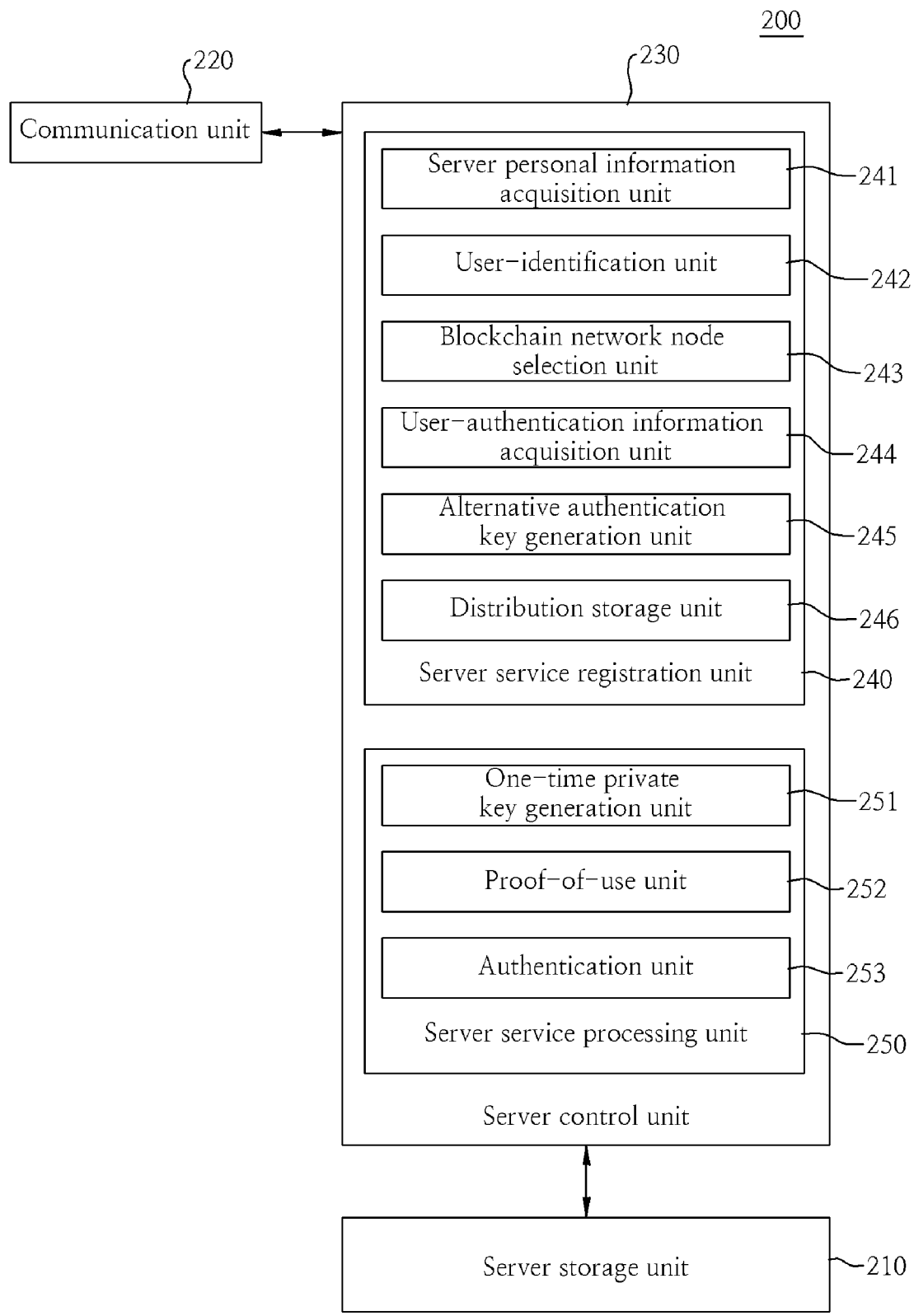
FIG. 3 is a diagram illustrating a configuration of a blockchain alternative authentication server of a system for providing personal information using a one-time private key based on a blockchain of proof of use according to the present disclosure.

FIG. 3 is a diagram illustrating a configuration of a blockchain alternative authentication server of a system for providing personal information using a one-time private key based on a blockchain of proof of use according to the present disclosure.

Referring to FIG. 3, the blockchain alternative authentication server 200 includes a server storage unit 210, a communication unit 220, and a server control unit 230.

The server storage unit 210 includes: a program area storing a control program for controlling the overall operation of the blockchain alternative authentication server 200; a temporary area temporarily storing data generated during the execution of the control program; and a data area semi-permanently storing data required during the execution of the control program and data generated during the same. The data area stores node identification information including service provider identification information, terminal identification information, etc. for service-providing node servers in the blockchain network 500, and service provider information including access (address) information, etc. The data area stores node transmission log information according to the present disclosure.

The communication unit 220 accesses the wired/wireless data communication network 10 and enables data communication to be performed with the user terminal 100, the user-identification institution server 300, the service provider server 400, and the service-providing node servers 510 in the blockchain network 500 that are connected to the wired/wireless data communication network 10.

The server control unit 230 includes a server service registration unit 240 and a server service processing unit 250, and controls the overall operation of the blockchain alternative authentication server 200 according to the present disclosure.

The server service registration unit 240 includes a server personal information acquisition unit 241, a user-identification unit 242, a blockchain network node selection unit 243, a user-authentication information acquisition unit 244, an alternative authentication key generation unit 245, and a distribution storage unit 246. The server service registration unit 240 generates alternative authentication keys, such as a public key, a private key, etc. for any user terminal 100 and provides the same to the user terminal 100. The server service registration unit 240 stores a personal information transaction statement including the personal information of the user of the user terminal 100, and a user public key in a distributed manner in multiple service-providing node servers 510 in the blockchain network 500 for registration for a blockchain alternative authentication service.

Specifically describing, the server personal information acquisition unit 241 acquires user-identification personal information, and personal information for service registration from the user terminal 100 through the communication unit 220 and outputs the same.

When the user-identification personal information is acquired through the server personal information acquisition unit 241, the user-identification unit 242 accesses the user-identification institution server 300, which is external, transmits user-identification request information including the user-identification personal information to request user identification, receives a user-identification result value (DI) in response thereto, and outputs and stores the same.

The blockchain network node selection unit 243 selects multiple service-providing node servers 510 in which the personal information received from the server personal information acquisition unit 241 is to be stored in a distributed manner, and outputs node identification information of the selected service-providing node servers 510.

The blockchain network node selection unit 243 may select service-providing node servers 510 of which the number ranges from at least two to 50% of the total number of service-providing node servers 510. This is to ensure the stability of personal information by storing the personal information in multiple service-providing node servers 510, and to minimize exposure of the personal information.

The user-authentication information acquisition unit 244 makes a request to the user terminal 100 for user-authentication information, and acquires, in response thereto, user-authentication information including a personal identification number (PIN) and biometric information, and terminal identification information from the user terminal 100, and stores the same in the server storage unit 210.

The alternative authentication key generation unit 245 generates alternative authentication keys, such as a private key, a public key, etc., by applying the user-identification result value (DI) and the user-authentication information, and transmits the generated alternative authentication keys, such as the private key, the public key, etc. to the user terminal 100 through the communication unit 220.

The alternative authentication key generation unit 245 may generate the alternative authentication keys by further applying a token variable value to the user-identification result value and the user-authentication information.

The alternative authentication key generation unit 245 may convert the alternative authentication keys, such as the private key, the public key, etc., into the form of QR codes and may provide the QR codes to the user terminal 100. The alternative authentication keys are hash random number values.

After the alternative authentication keys are provided, the distribution storage unit 246 acquires personal information for a service through the server personal information acquisition unit 241, generates a personal information transaction statement including the personal information, encrypts the personal information transaction statement with the public key, and transmits the encrypted personal information transaction statement and the public key to the service-providing node servers 510 of the node identification information output from the blockchain network node selection unit 243 so that the encrypted personal information transaction statement and the public key are stored, wherein the service-providing node servers 510 are at least two to 50% of all the service-providing nodes.

After the personal information transaction statement is stored in a distributed manner, the distribution storage unit 246 deletes the generated alternative authentication keys, such as the public key, the private key, etc., and the personal information transaction statement, generates node transmission log information corresponding to distributed storage in the service-providing node servers 510, and stores the node transmission log information in the server storage unit 210. The node transmission log information may include the terminal identification information of the user terminal 100, personal information transaction statement tag information, distributed-storage time information, the transmitted node identification information of the service-providing node servers 510, etc.

The server service processing unit 250 includes a one-time private key generation unit 251, a proof-of-use unit 252, and an authentication unit 253, and performs the overall processing for the blockchain alternative authentication service of the present disclosure.

Specifically describing, the one-time private key generation unit 251 is configured to: receive alternative authentication keys, such as a public key, a private key, etc., from the user terminal 100; perform user authentication and terminal authentication for the user through the authentication unit 253 when one-time private key issue request information including service provider information and required personal information field information is received; select, when authentication succeeds, any one node among the multiple service-providing node servers 510 storing the personal information transaction statement of the user terminal 100 and the public key; and generate a first one-time private key and a second one-time private key in a pair.

The one-time private key generation unit 251 transmits the generated first one-time private key to the service provider server 400 corresponding to the service provider information included in the one-time private key issue request information directly or via the user terminal 100. The one-time private key generation unit 251 generates a personal information request statement including the second one-time private key, the service provider information, the required personal information field information, and one-time private key pair authentication information, and transmits the personal information request statement to the selected service-providing node servers 510.

The proof-of-use unit 252 generates one or more new blocks of a predetermined file size for a fact confirmation certificate including a detailed statement of use, which is a record of details of use of the personal information transaction statement stored in a distributed manner in the service-providing node servers 510 in the blockchain network 500 at the time for registration for the blockchain alternative authentication service, performs proof of use on the generated blocks, and forms a chain between blocks. A detailed operation of the proof-of-use unit 252 will be described later in detail with reference to FIG. 8.

The authentication unit 253 compares both the user-authentication information and the terminal identification information that are included in the one-time private key issue request information received from the one-time private key generation unit 251 when the request for user authentication for the user is made as described above, with the user-authentication information and the terminal identification information that are previously registered and stored at the time of service registration, thereby performing user authentication and terminal authentication for the user on the basis of whether the pieces of information are matched.

Figure 4:
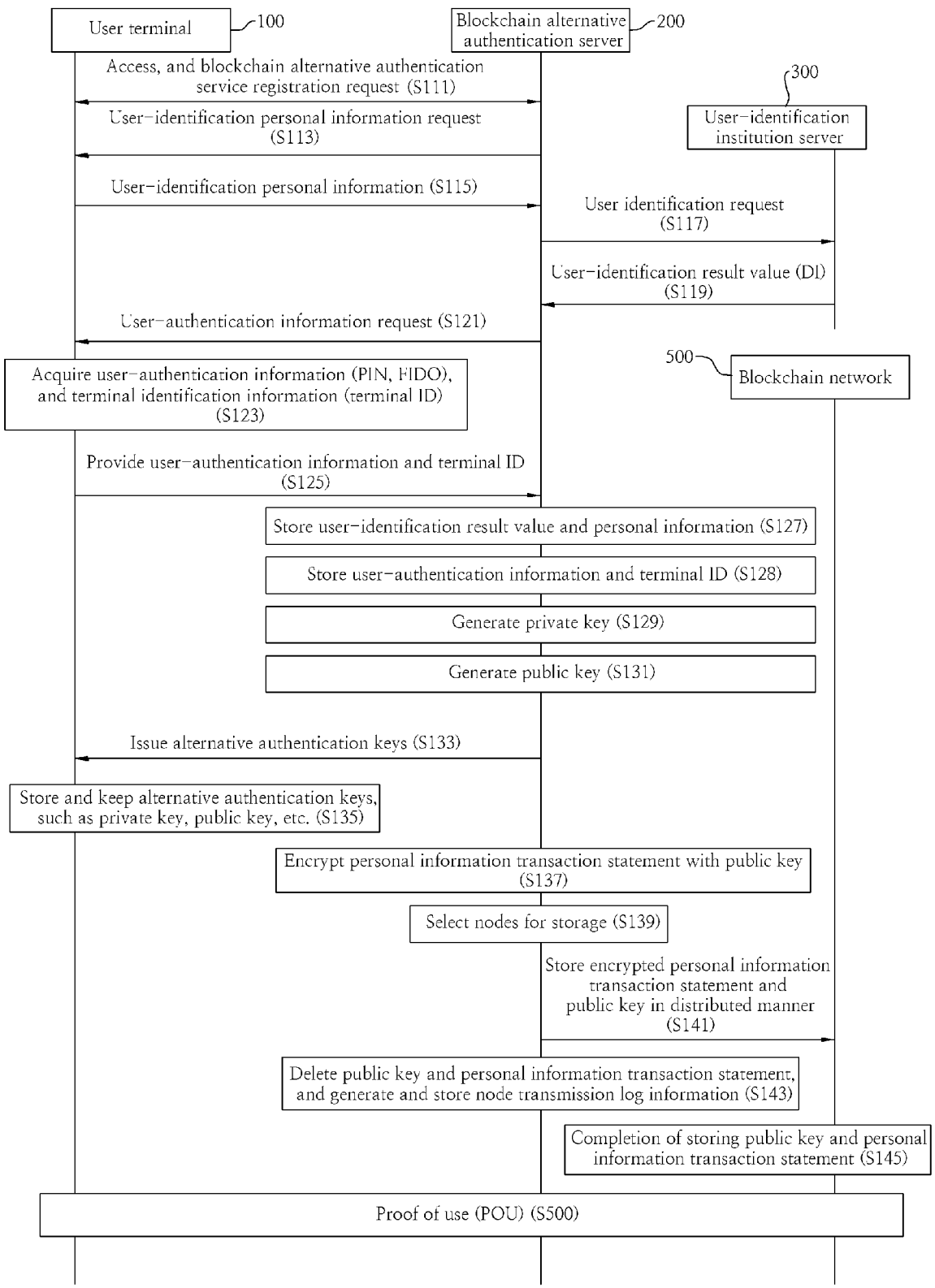
FIG. 4 is a flowchart illustrating a blockchain alternative authentication service registration method of a system for providing personal information using a one-time private key based on a blockchain of proof of use according to the present disclosure.

FIG. 4 is a flowchart illustrating a blockchain alternative authentication service registration method of a system for providing personal information using a one-time private key based on a blockchain of proof of use according to the present disclosure.

Referring to FIG. 4, the user accesses the blockchain alternative authentication server 200 through the user terminal 100 in order to use a blockchain alternative authentication service according to the present disclosure, requests registration for the blockchain alternative authentication service, and performs agreement on terms, etc.

Then, the user terminal 100 transmits blockchain alternative authentication service registration request information to the blockchain alternative authentication server 200 at step S111.

When a blockchain alternative authentication service registration request is made from any user terminal 100, the blockchain alternative authentication server 200 makes a request to the user terminal 100 for user-identification personal information at step S113, and receives the user-identification personal information from the user terminal 100 at step S115.

When the user-identification personal information is received, the blockchain alternative authentication server 200 accesses the user-identification institution server 300 and transmits user-identification request information including the user-identification personal information to request user identification at step S117, and receives, in response thereto, a user-identification result value (DI) from the user-identification institution server 300 and stores the same in the server storage unit 210 at step S119.

When the user-identification result value is received, the blockchain alternative authentication server 200 makes a request to the user terminal 100 for user-authentication information at step S121.

Then, the user terminal 100 acquires user-authentication information including a personal identification number (PIN) and biometric information (FIDO), and terminal identification information through the user-authentication information acquisition unit 172 at step S123, and transmits the user-authentication information including the PIN and the FIDO, and the terminal identification information, such as a terminal ID, etc., to the blockchain alternative authentication server 200 at step S125.

After receiving the user-authentication information and the terminal identification information, the blockchain alternative authentication server 200 stores the user-identification result value (DI) and the user-authentication information in the server storage unit 210 at step S127, and generates alternative authentication keys, such as a private key, a public key, etc. at steps S129 and S131. As described above, the blockchain alternative authentication server 200 may generate the alternative authentication keys by adding any token variable value to the user-identification result value and the user-authentication information.

The generated alternative authentication keys, such as the public key, the private key, etc., are provided to the user terminal 100 at step S133.

After receiving the alternative authentication keys, such as the public key, the private key, etc., the user terminal 100 stores the received public key and the received private key in the storage unit 110 at step S135.

The blockchain alternative authentication server 200 that has generated the alternative authentication keys, such as the public key, the private key, etc., and has transmitted the same to the user terminal 100 provides a personal information input user interface means to the user terminal 100 to receive personal information from the user, or acquires personal information by extracting it from previously stored information at step S136.

After the personal information is acquired, the blockchain alternative authentication server 200 selects multiple service-providing node servers 510 among service-providing node servers 510 constituting the blockchain network 500, and stores node identification information of the selected service-providing node servers 510 at step S137.

When the service-providing node servers 510 are selected, the blockchain alternative authentication server 200 generates a personal information transaction statement including the personal information and encrypts the generated personal information transaction statement with the public key at step S139. The personal information may be acquired after selection of the service-providing node servers 510.

When the personal information transaction statement is encrypted, the blockchain alternative authentication server 200 transmits the encrypted personal information transaction statement and a user public key to the selected service-providing node servers 510 in the blockchain network 500 at step S141.

Then, the service-providing node servers 510 in the blockchain network 500 store the personal information transaction statement and the user public key at step S145.

After the personal information transaction statement and the user public key are stored in a distributed manner, the blockchain alternative authentication server 200 deletes the generated public key and the generated personal information transaction statement, generates node transmission log information, and stores the same in the server storage unit 210 at step S143.

After distributed storage of the personal information transaction statement and the user public key, the blockchain alternative authentication server 200 performs proof of use on the basis of a detailed statement of use for the user public key and the personal information transaction statement that are stored in a distributed manner, so that new blocks and existing blocks are chained at step S500. The proof of use will be described later in detail with reference to FIG. 8.

Figure 5:
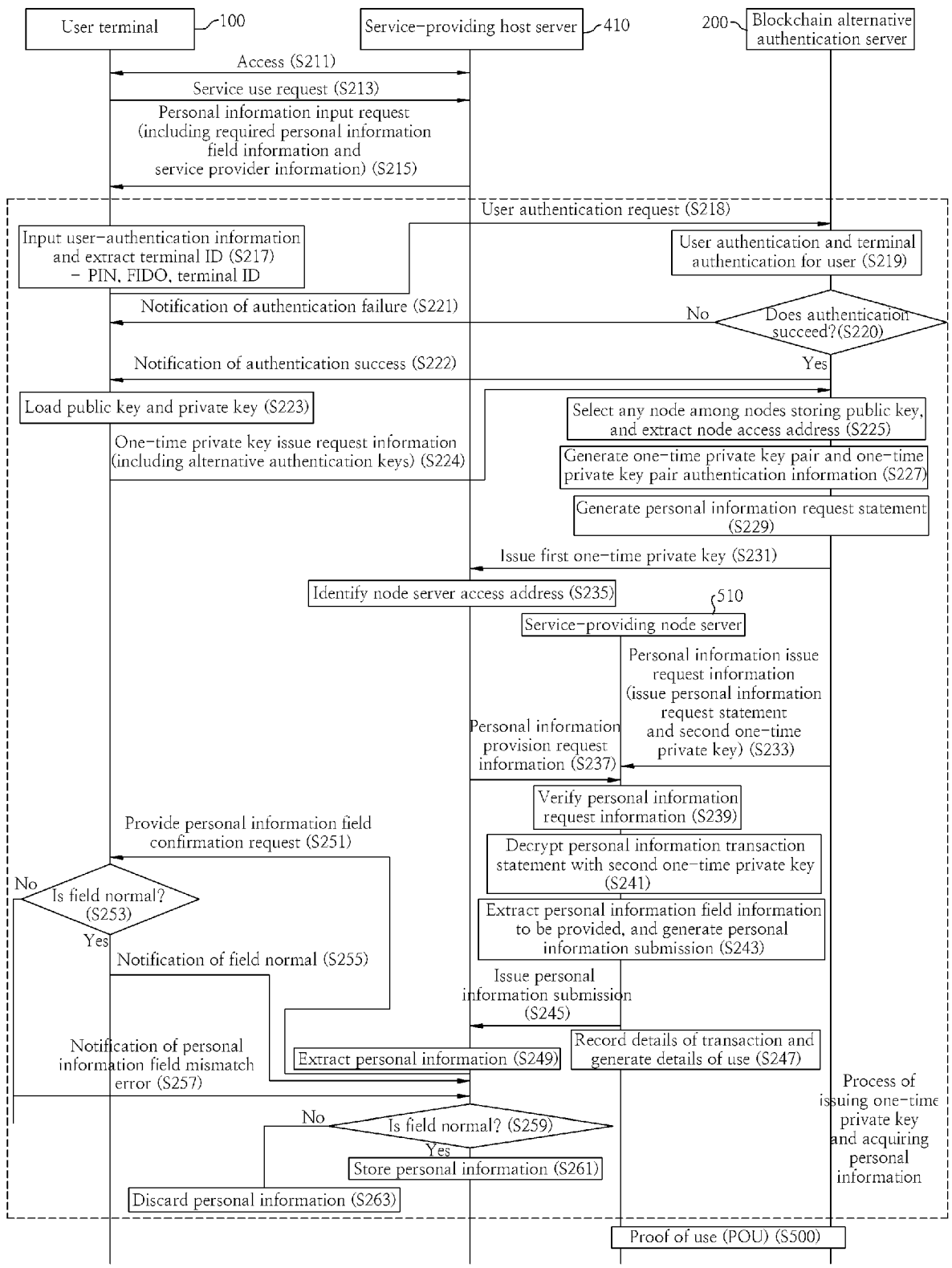
FIG. 5 is a flowchart illustrating a method for providing personal information, in a system for providing personal information using a one-time private key based on a blockchain of proof of use according to an embodiment of the present disclosure.

FIG. 5 is a flowchart illustrating a method for providing personal information, in a system for providing personal information using a one-time private key based on a blockchain of proof of use according to an embodiment of the present disclosure, which illustrates a method for providing personal information in a case in which the service provider server 400 is not the service-providing node server 510 in the blockchain network 500 but the service-providing host server 410 that is an external server.

Referring to FIG. 5, the user terminal 100 that wants to receive a service through the service-providing host server 410 accesses the service-providing host server 410 at step S211, and makes a service use request to the service-providing host server 410 at step S213. The service use request may be membership registration, login, etc., or may be online and offline-use requests for a particular service. The service use request may be made by provision of the public key stored in the user terminal 100, and the public key may be provided in the form of a QR code.

When any one user terminal 100 makes a service use request, the service-providing host server 410 transmits, to the user terminal 100, personal information input request information including required personal information field information for personal information items (fields) required to provide the service and service provider information, at step S215. The service provider information may include service provider identification information, an encryption key, and a reply address.

The user terminal 100 that receives the request for personal information acquires user-authentication information including a PIN, FIDO, etc. and terminal identification information through the input unit 130, the biometric recognition information detection unit 150, and the storage unit 110, and transmits user-authentication request information including the user-authentication information and the terminal identification information to the blockchain alternative authentication server 200 at step S218.

The blockchain alternative authentication server 200 that receives the user-authentication information and the terminal identification information performs user authentication and terminal authentication for the user at step S219, determines whether authentication succeeds at step S220, and gives notification of authentication failure at step S221 or notification of authentication success at step 222.

After notification of authentication success, the user terminal 100 receives a user public key and a private key directly through an input interface or loads a user public key and a private key at step S223, and transmits one-time private key issue request information including the user-authentication information, the public key, the private key, SP information, and the required personal information field information to the blockchain alternative authentication server 200 at step S224.

After user authentication and terminal authentication for the user succeed, the blockchain alternative authentication server 200 selects any service-providing node server 510 among the service-providing node servers 510 storing the public key that is the same as the received user public key and detects a node server access address of the selected service-providing node server 510 at step S225, and generates a one-time private key pair and one-time private key pair authentication information at step S227. The one-time private key pair may include the first one-time private key and the second one-time private key in a pair. The one-time private key may be provided as a QR code, and is represented as a one-time private key, such as a first one-time private key, a second one-time private key, etc., in the drawings.

The blockchain alternative authentication server 200 generates a personal information request statement including the user public key, the node server access address, the required personal information field information, the service provider information, a timestamp, and the one-time private key pair authentication information at step S229, and issues the node server access address and the first one-time private key to the service-providing host server 410 at step S231, and transmits personal information issue request information including the personal information request statement and the second one-time private key to the service-providing node server 510 at step S233. The node server access address and the first one-time private key transmitted by the blockchain alternative authentication server 200 may be provided to the service-providing host server 410 through the user terminal 100, or may be directly provided to the service-providing host server 410.

The service-providing host server 410 that receives the first one-time private key identifies the node server access address that is a node server access address at step S235, and transmits personal information provision request information including the service provider information and the first one-time private key to the service-providing node server 510 at step S237.

When the personal information issue request information is received from the blockchain alternative authentication server 200 and the personal information provision request information is received from the service-providing host server 410, the service-providing node server 510 compares information of the personal information request statement of the personal information issue request information received from the blockchain alternative authentication server 200 and pieces of information of the personal information provision request information so as to perform verification at step S239.

After verification succeeds, the service-providing node server 510 detects the personal information transaction statement matched to the user public key and decrypts the personal information transaction statement of the user terminal 100 by using the second one-time private key at step S241. The service-providing node server 510 extracts, from the personal information transaction statement, personal information fields corresponding to the required personal information field information and generates a personal information submission including the personal information of the personal information items corresponding to the required personal information field information, and encrypts the personal information submission with the received encryption key of the service provider at step S243. When the encrypted personal information submission is generated, the service-providing node server 510 issues the personal information submission to the received reply address of the service-providing host server 410 at step S245, and generates a detailed statement of use by recording details of use of the public key and of the personal information transaction statement and stores the same at step 247.

The service-providing host server 410 that receives the encrypted personal information submission decrypts the personal information submission and provides the user terminal 100 with personal information field confirmation request information for requesting confirmation of the personal information for each required personal information field at step S251.

When the personal information field confirmation request information is received, the user terminal 100 displays it. When the user confirms that fields are normal at step S253, the user terminal 100 gives the service-providing host server 410 notification of field normal to report that the fields are normal at step S255. When there is abnormality in the fields, the user terminal 100 gives the service-providing host server 410 notification of a personal information field mismatch error to report that the fields are abnormal at step S257.

After the personal information field confirmation request information is provided, the service-providing host server 410 monitors whether notification of personal information field normal is received or notification of a personal information field mismatch error is received from the user terminal 100 at step S259. When notification of a personal information field mismatch error is given, the service-providing host server 410 discards the personal information and ends at step S263. When notification of personal information field normal is given, the service-providing host server 410 requests an agreement on storing the acquired personal information and the acquired user public key for the cases, such as login after service membership registration, or provision of a service, and stores the personal information and the user public key under the agreement. The service-providing host server 410 stores the personal information and provides the service at step S261.

The blockchain alternative authentication server 200 may perform proof of use and a blockchain routine according to the generating of the one-time private key pair and the providing of the first one-time private key to the service-providing host server 410 and the providing of the second one-time private key to the service-providing node server 510 at step S500. The proof of use and the blockchain routine will be described later in detail with reference to FIG. 8.

Figure 6:
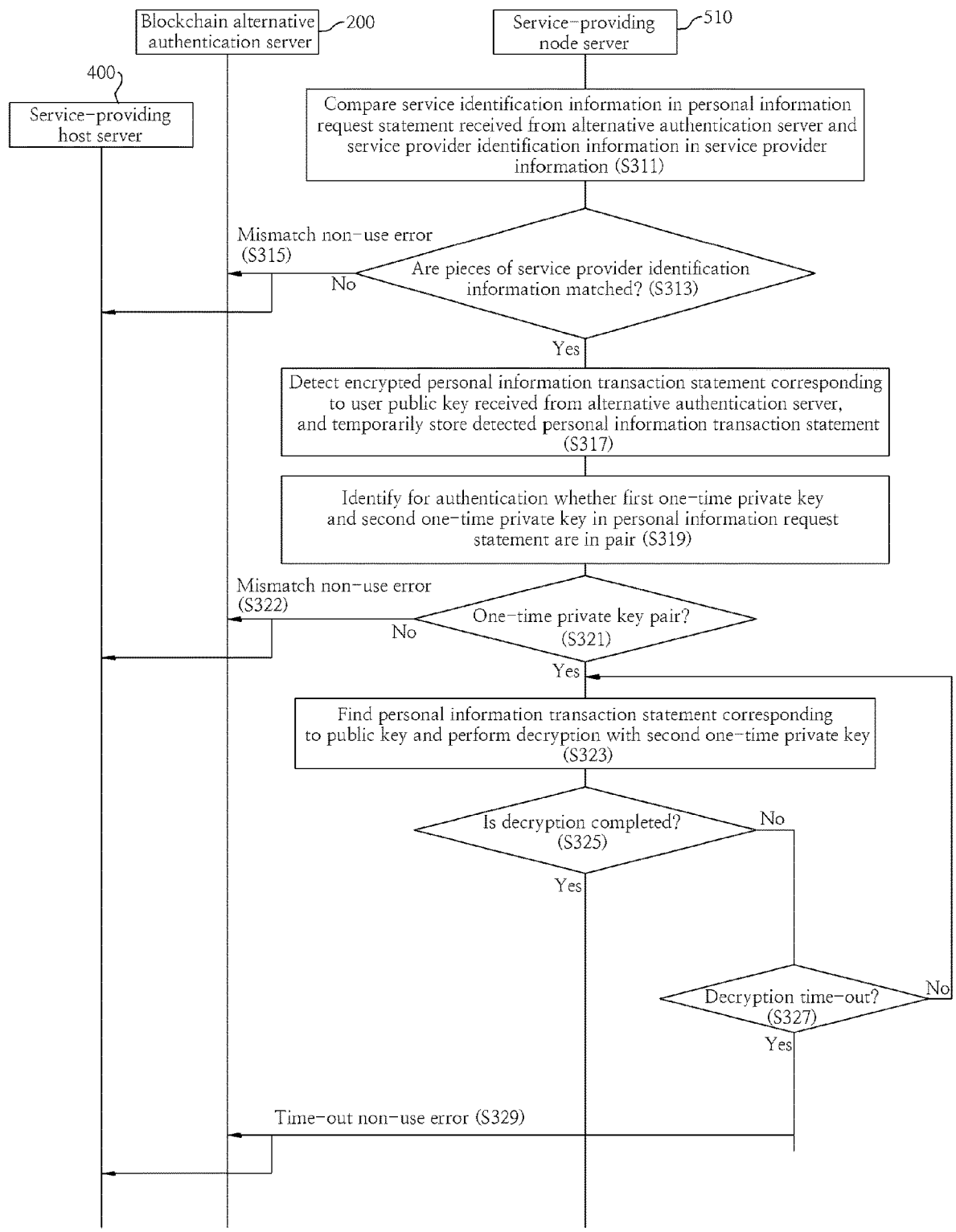
FIG. 6 is a flowchart illustrating a method of verifying a one-time private key, in a method for providing personal information, in a system for providing personal information using a one-time private key based on a blockchain of proof of use according to the present disclosure.

FIG. 6 is a flowchart illustrating a method of verifying a one-time private key, in a method for providing personal information, in a system for providing personal information using a one-time private key based on a blockchain of proof of use according to the present disclosure, which is a flowchart illustrating S239 and S241 of FIG. 5 in more detail.

Referring to FIG. 6, when the personal information request statement is received from the blockchain alternative authentication server 200 and the personal information provision request information is received from the service-providing host server 410, the service-providing node server 510 compares the service provider identification information included in the personal information provision request information and the service provider identification information of the personal information request statement at step S311, performs authentication on the service provider identification information according to determination of whether the pieces of information are matched at step S313, and transmits a mismatch non-use error message to the blockchain alternative authentication server 200 and the service-providing host server 410 for the case of the mismatch at step S315.

When authentication on the service provider identification information succeeds, the service-providing node server 510 detects the encrypted personal information transaction statement corresponding to the user public key received from the blockchain alternative authentication server 200 and temporarily stores the encrypted personal information transaction statement at step S317.

After temporarily storing the personal information transaction statement, the service-providing node server 510 identifies whether the first one-time private key included in the personal information provision request information and the second one-time private key included in the personal information request statement are in a pair within a preset time at step S319, and performs authentication on the one-time private key by determining whether they are in a pair at step S321.

When the one-time private keys are matched, the service-providing node server 510 performs decryption on the personal information transaction statement that is detected and temporarily stored, with the second one-time private key within a predetermined time at step S323.

The service-providing node server 510 examines whether decryption is completed within the predetermined time after decryption starts at steps S325 and S327.

When the first one-time private key and the second one-time private key are not in a pair, the service-providing node server 510 gives notification of mismatch non-use error information to the blockchain alternative authentication server 200 and the service-providing host server 410 at step S322.

In addition, when decryption with the second one-time private key is not completed within the predetermined time, the service-providing node server 510 provides time-out non-use error information to the blockchain alternative authentication server 200 and the service-providing host server 410 at step S329.

With reference to FIGS. 5 and 6, the process of requesting and acquiring personal information performed by the service provider server 400 that is the service-providing host server 410, which is a server not belonging to the blockchain network 500, has been described. In addition, similarly to FIGS. 5 and 6, the service-providing node server 510, which is an internal service provider server 400, belonging to the blockchain network 500 receives personal information through any one of other service-providing node servers 510-2 excluding the service-providing node server 510 by performing the process of requesting and acquiring the personal information.

Figure 7:
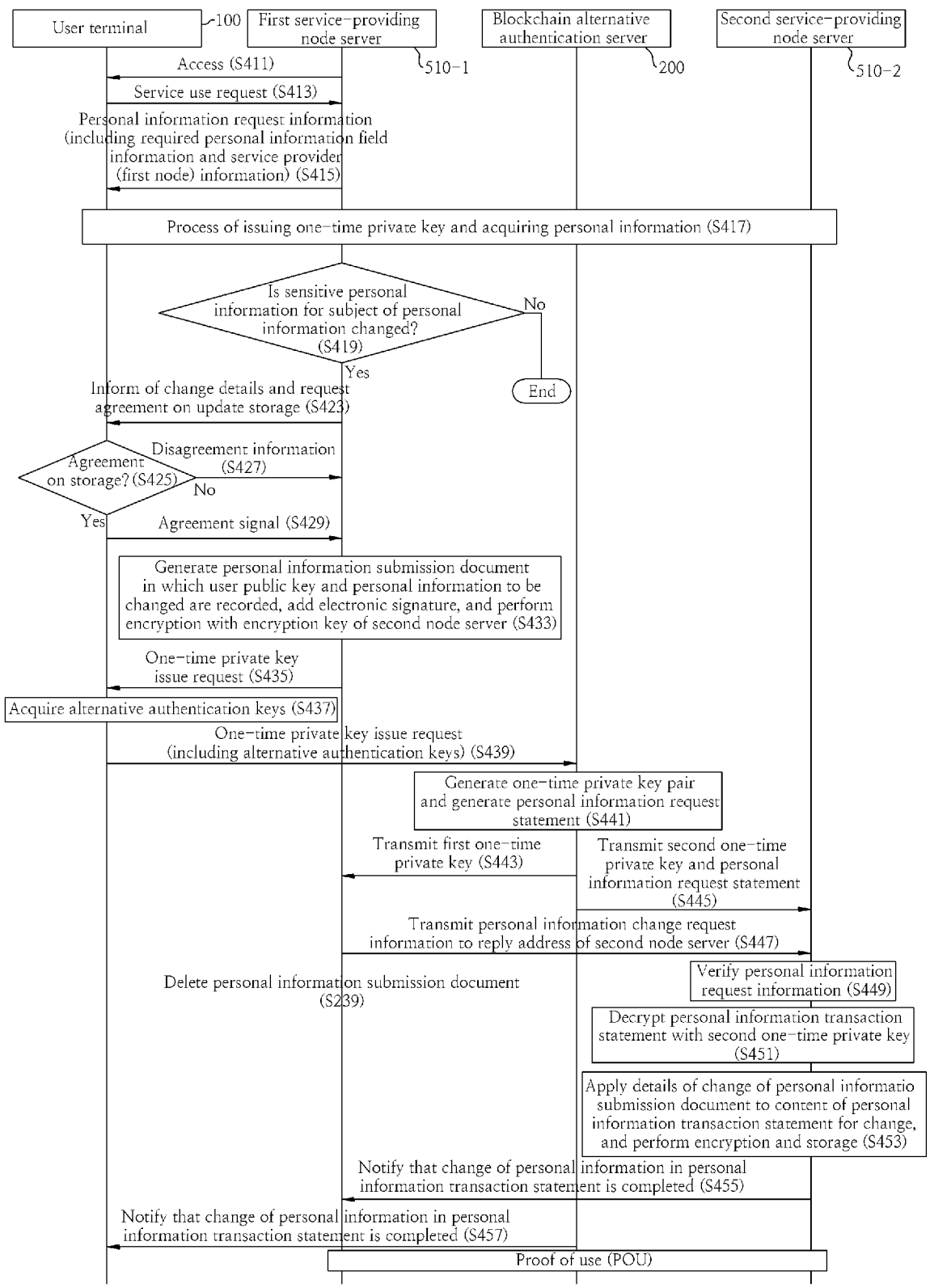
FIG. 7 is a flowchart illustrating a method for providing personal information and a method for updating personal information, in a system for providing personal information using a one-time private key based on a blockchain of proof of use according to another embodiment of the present disclosure.

FIG. 7 is a flowchart illustrating a method for providing personal information and a method for updating personal information, in a system for providing personal information using a one-time private key based on a blockchain of proof of use according to another embodiment of the present disclosure, which is a diagram illustrating a case in which the service provider server 400 acquires personal information to a service-providing node server 510-1 belonging to the blockchain network 500 through another service-providing node server 510-2 belonging to the blockchain network 500.

Referring to FIG. 7, the service-providing node server 510-1 acquires personal information for the required personal information fields of the user terminal 100 through steps S411 to S417 in the same manner as those in FIG. 5. However, the operation performed by the service-providing host server 410 in FIG. 5 is performed by the service-providing node server 510-2.

The service-providing node server 510-1 monitors whether as a service is provided, the personal information including the sensitive personal information for the user of the user terminal 100, that is, the subject of the personal information is changed, for example, addition, deletion, modification, etc., at step S419. Herein, the service-providing node server 510-1 has required personal information, and receives the personal information issued from any one selected among the service-providing node servers 510-2 providing personal information, as a personal information submission document including service provider identification information, an encryption key, and a reply address of the selected service-providing node server 510-2. For example, the service-providing node server 510-1 may be a server of a hospital. Medical and medical prescription records, which belong to one type of sensitive personal information of the user, may be added, for example, medical treatments or prescription drugs based on medical history are changed or added, and so on, and thus the sensitive personal information may be changed.

As in the above example, when the personal information including the sensitive personal information is changed, the service-providing node server 510-1 transmits change-details-informing and agreement inquiry information to the user terminal 100 in order to inform the user terminal 100 of change details and get the agreement on updating information at step S423.

The user terminal 100 displays the change-details-informing and agreement inquiry information and monitors whether the agreement is gotten from the user at step S425. In the case of disagreement, the user terminal 100 transmits a disagreement signal to the service-providing node server 510-1 at step S427. In the case of agreement, the user terminal 100 transmits an agreement signal to the service provider server 400 at step S429.

When the agreement signal is received from the user terminal 100, the service-providing node server 510-1 generates a personal information submission document in which a user public key and personal information to be changed are recorded, adds an electronic signature, and performs encryption with the encryption key of the service-providing node server 510-2 at step S433.

When the personal information submission document is encrypted, the first service-providing node server 510-1 transmits one-time private key issue request information to the user terminal 100 at step S435. The private key issue request information may include personal information change information, which is information on the personal information to be changed, and the service provider information of the first service-providing node server 510-1.

The user terminal 100 acquires alternative authentication keys, such as a public key, a private key, etc. at step S437, and transmits the one-time private key issue request information including the alternative authentication keys to the blockchain alternative authentication server 200 at step S439. The one-time private key issue request information further includes the personal information change information and the service provider information of the first service-providing node server 510-1.

The blockchain alternative authentication server 200 that receives the one-time private key issue request information generates a first one-time private key and a second one-time private key in a pair, and generates a personal information request statement including the user public key, the personal information change information, the service provider information of the first service-providing node server 510-1, one-time private key pair authentication information, etc. at step S441.

After generating the personal information request statement, the blockchain alternative authentication server 200 transmits the first one-time private key directly to the first service-providing node server 510-1 or transmits the first one-time private key to the first service-providing node server 510-1 via the user terminal 100 at step S443, and transmits the second one-time private key and the personal information request statement to the second service-providing node server 510-2 at step S445.

The first service-providing node server 510-1 that receives the first one-time private key transmits personal information change request information to the reply address of the second service-providing node server 510-2 at step S447. The personal information change request information includes the first one-time private key, the personal information submission document, the service provider information of the first service-providing node server 510-1, etc.

The second service-providing node server 510-2 verifies the personal information request information at step S449 as described in FIG. 6, and decrypts the personal information transaction statement with the second one-time private key at step S451.

When the personal information transaction statement is decrypted, the second service-providing node server 510-2 applies the details of change of the personal information submission document to the existing content of the personal information transaction statement for change, and performs encryption and storage at step S453.

When the details of change is applied to the personal information transaction statement, the second service-providing node server 510-2 notifies the first service-providing node server 510-1 and the user terminal 100 that change of the personal information in the personal information transaction statement is completed, at steps S455 and S457.

FIG. 8 is a flowchart illustrating a proof-of-use scheme of a blockchain alternative authentication server, in a method for providing personal information, in a system for providing personal information using a one-time private key based on a blockchain based on a proof of use according to the present disclosure.

Referring to FIG. 8, the service-providing node servers 510 of the blockchain network 500 generate a detailed statement of use including the fact that the personal information submission is generated and transmitted, process details, change details, and an electronic signature at step S512 because the personal information transaction statement is used, and transmit proof-of-use request information including the detailed statement of use and node (service provider) identification information (ID) to the blockchain alternative authentication server 200 at step S513.

The blockchain alternative authentication server 200 acquires detailed statements of use from multiple nodes and classifies the same according to a predetermined time, the purpose of use, the node ID, etc. at step S515, and identifies the electronic signature of the node ID at step S517.

After the electronic signature is identified, the blockchain alternative authentication server 200 performs abnormal-transaction detection on the contents of the detailed statement of use and classifies the risk level thereof at step S519.

For example, if it is detected that a user provides a public key for an offline service at the same time in physically different locations and personal information is provided to the service provider, this is an indicator of suspicion about illegal use of the personal information. If the personal information is sensitive personal information, the risk degree may be classified as being at a high point in section-based levels.

The blockchain alternative authentication server 200 monitors detection of an abnormal transaction at step S521. When an abnormal transaction is detected at step S523, abnormal-transaction detection notification information for notification of detection of the abnormal transaction is transmitted to the service-providing node server 510 and the user terminal 100, or to the first service-providing node server 510-1, the second service-providing node server 510-2, and the user terminal 100 at steps S525 and S527.

Conversely, when abnormal transaction is not detected, the blockchain alternative authentication server 200 increases a trust index for the detailed statement of use (for example, a trust index is increased by 1 when abnormal transaction is not detected each time one examination is performed), and applies the trust index to apply a trust index evaluation item including the trust index and a fact confirmation verification value for an evaluation method at step S529. The trust index may be a value that is continuously accumulated if abnormal transaction is not detected each time proof of use is performed.

For example, when a user makes personal information provision requests 100 times to receive services of multiple service providers and abnormal transaction is not detected, it is determined that a personal information transaction statement of the user is kept secure with the latest content. Therefore, the reliability of the public key of the user and the personal information is high, and with respect to a detailed statement of use therefor, a high trust index may be applied.

Conversely, when a user has never made a personal information provision request after blockchain alternative authentication service registration, or when the proportion of abnormal transaction to the number of uses is detected at a predetermined value or larger during abnormal-transaction detection, there is a risk and reliability is low. With respect to a detailed statement of use therefor, a low trust index may be applied.

When the fact confirmation verification value is calculated, the blockchain alternative authentication server 200 generates a fact confirmation certificate including the fact confirmation verification value and an electronic signature of the blockchain alternative authentication server 200, completes a proof-of-use processing at step S531, generates new blocks on a per-predetermined-file-size basis at step S533, applies a chain code hash random number thereto at step S535, and transmits the block to all the service-providing node servers 510 in the blockchain network 500 for sharing at step S537.

The service-providing node server 510 chain updates the existing blocks with the chain code hash random number of the new blocks and stores the result at step S539.

For example, the personal information may be classified into three types: personal unique identification information, such as a name, a birth date, and a sex; personal alternative identification information, such as an email address, a card number, and a phone number; and sensitive personal information, such as medical records, academic records, a profile, etc. These types of personal information are changed, for example, addition, deletion, modification, etc. Regarding pieces of the personal information used in various services, the reliability and the value of the pieces of the personal information are measured by different evaluation criteria.

The evaluation criteria vary with country-based policy, culture, and standard and service providers and are affected by changing environments or standards. Therefore, it is also evaluated whether various, changed, and appropriate criteria are applied in an evaluation item or an evaluation method for reliability of the personal information of the user, and methodological integrity of reliability calculation is verified through evaluation of a process of measuring the reliability of the fact about use of the personal information and of a detailed statement of use.

If medical records, which belong to sensitive personal information to which individual's agreement is applied according to the relevant regulations, are updated without individual's agreement, the medical records exist even though these should not exist. Therefore, the personal information itself may have a high reliability because the latest details of use have been recorded. However, there is a possibility that individual's rights are violated or that an error occurs in an agreement confirmation procedure or program, and a future-response system needs to operate to delete the updated personal information, so a fact confirmation verification value may be low.

The fact confirmation certificate is a node ID and a detailed statement of use that are generated and transmitted by nodes for use of the personal information. The fact confirmation certificate is generated through the process of measuring a trust index by the alternative authentication server and verifying fact confirmation, and indicates clear authentication of confirmation of the following: the fact about transaction of the personal information, the personal information itself, and the reliability of an individual user, a personal-information user, etc.

In the meantime, the present disclosure is not limited to the above-described exemplary embodiments, and it will be understood by those skilled in the art that various improvements, modifications, substitutions, and additions may be made without departing from the scope of the present disclosure. It is noted that if embodiments by such improvements, modifications, substitutions, and additions are within the scope of the following appended claims, the technical ideas thereof are also within the scope of the present disclosure.

DESCRIPTION OF THE REFERENCE NUMERALS IN THE DRAWINGS

10: wired/wireless data communication network 100: user terminal
110: storage unit 120: display unit
130: input unit 140: wireless communication unit
141: long-distance wireless communication unit
142: short-distance wireless communication unit 150: biometric information acquisition unit 151: fingerprint detection unit
152: iris detection unit 153: voice feature detection unit
160: camera 170: terminal control unit
171: personal information acquisition unit 172: user-authentication information acquisition unit
173: service registration unit 174: service processing unit
181: personal identification information acquisition unit 182: biometric information acquisition unit
183: terminal identification information acquisition unit 184: service registration request unit
185: alternative authentication key reception unit 186: service request unit
187: one-time private key request unit 188: user approval unit
200: blockchain alternative authentication server
210: server storage unit 220: communication unit
230: server control unit 240: server service registration unit
241: server personal information acquisition unit 242: user-identification unit
243: blockchain network node selection unit
244: user-authentication information acquisition unit 245: alternative authentication key generation unit
246: distribution storage unit 250: server service processing unit
251: one-time private key (OTQ) generation unit 252: proof-of-use unit
253: authentication unit 300: user-identification institution server
400: service provider server 410: service-providing host server
500: blockchain network 510: node (=service-providing node server)

The invention claimed is:

1. A system for providing personal information using a one-time private key based on a blockchain of proof of use, the system comprising:
a user terminal configured to:
store a public key and a private key,
transmit a service use request to a service provider server;
receive a request for required personal information field information from the service provider server; and
transmit one-time private key issue request information including user-authentication information and terminal identification information, to the service provider server;
a blockchain network including multiple service-providing node servers that are configured to:
store a personal information transaction statement encrypted with the public key of the user terminal in a distributed manner,
when a first one-time private key and a second one-time private key for any personal information transaction statement are received and the first one-time private key and the second one-time private key are in a pair, extract the personal information for a required personal information field that is requested, by decrypting the personal information transaction statement with the second one-time private key, and
generate and issue a personal information submission including the extracted personal information for the required personal information field;
the service provider server configured to:
make the request for the required personal information field information to the user terminal in response to the service use request,
receive the first one-time private key,
transmit personal information provision request information including the first one-time private key to a service-providing node server of a service-providing node server access address that is received when the first one-time private key is issued, and
receive, in response thereto, the personal information submission from the service-providing node server in the blockchain network to acquire the personal information; and
a blockchain alternative authentication server configured to:
store the user-authentication information and the terminal identification information for the user terminal, and a node transmission log including information on the service-providing node server storing the personal information transaction statement for a user of the user terminal,
generate the first one-time private key and the second one-time private key in a pair when the one-time private key issue request information is received from the user terminal,
transmit the first one-time private key to the service provider server from which the user terminal is to receive the service, and
provide the second one-time private key to the service-providing node server in the blockchain network having the personal information transaction statement for the user of the user terminal, on the basis of the node transmission log.

2. The system of claim 1, wherein the user terminal is configured to
transmit blockchain alternative authentication service registration request information to the blockchain alternative authentication server,
when the blockchain alternative authentication server requests user-identification personal information correspondingly, provide the blockchain alternative authentication server with the user-identification personal information acquired,
when the blockchain alternative authentication server makes a request for the user-authentication information, acquire the user-authentication information and the terminal identification information of the user terminal and transmit the same to the blockchain alternative authentication server, and
receive alternative authentication keys including the public key and the private key from the blockchain alternative authentication server and store the alternative authentication keys for registration for a blockchain alternative authentication service; and
the blockchain alternative authentication server is configured to
provide the user-identification personal information to a user-identification institution server to request user authentication,
by applying a user-identification result value corresponding thereto and the user-authentication information received from the user terminal, generate the alternative authentication keys including the public key and the private key and provide the same to the user terminal, select multiple nodes in which the personal information transaction statement for the user of the user terminal is to be stored, encrypt the personal information transaction statement, which is a record of the personal information received through the user terminal, with the public key, and store the encrypted personal information transaction statement in a plurality of the service-providing node servers for the selected nodes in a distributed manner for registration.

3. The system of claim 2, wherein the blockchain alternative authentication server randomly selects the nodes that are two to 50% of all the nodes, and stores the personal information transaction statement encrypted with the public key in the service-providing node servers corresponding to the selected nodes in a distributed manner.

4. The system of claim 2, wherein the blockchain alternative authentication server deletes the public key, the private key, and the personal information transaction statement that are generated and provided over the blockchain network.

5. The system of claim 1, wherein the service provider server is the service-providing node server belonging to the blockchain network, and after the personal information is acquired, when any one or more of addition, deletion, and modification of the personal information for the user of the user terminal occur as the service is provided, the service-providing node server generates the personal information submission including an electronic signature of the service-providing node server, performs encryption using an encryption key and a reply address of the service-providing node server that has provided the personal information, and transmits the encrypted personal information to the service-providing node server, so that the personal information for the user of the user terminal is updated.

6. The system of claim 1, wherein the blockchain alternative authentication server is configured to receive, from the service-providing node, a detailed statement of use that is a record of details of use of the personal information transaction statement stored in a distributed manner, generate a fact confirmation certificate on the basis of the detailed statement to complete proof of use, generate new blocks on a per-predetermined-file-size basis, and perform chaining with existing blocks and a hash random number.

7. The system of claim 2, wherein the user terminal comprises:

a wireless communication unit performing data communication with the service provider server and the blockchain alternative authentication server over a wired/wireless data communication network;

a display unit;

an input unit;

a biometric recognition information detection unit detecting and outputting biometric information of the user; and a terminal control unit comprising a processor configured to transmit the one-time private key issue request information and the blockchain alternative authentication service registration request information to the blockchain alternative authentication server through the wireless communication unit, acquire the user-identification personal information through the display unit and the input unit when the user-identification personal information is requested correspondingly and provide the user-identification personal information to the blockchain alternative authentication server, when either the request for the user-authentication information from the blockchain alternative authentication server or the request for the required personal information field information is made, acquire the biometric information through the biometric recognition information detection unit, acquire a personal identification number (PIN) through the display unit and the input unit, and acquire the user-authentication information including the biometric information and the personal identification number, transmit the acquired user-authentication information and the acquired terminal identification information to the blockchain alternative authentication server through the wireless communication unit, and receive the alternative authentication keys including the public key and the private key from the blockchain alternative authentication server and store the alternative authentication keys for registration for the blockchain alternative authentication service.

8. The system of claim 7, wherein the biometric recognition information detection unit comprises one or more of the following:

a fingerprint detection unit detecting and outputting fingerprint information of a finger of the user;

an iris detection unit outputting iris information from an iris of the user;

a voice feature detection unit outputting voice feature information of a voice of the user;

a face recognition detection unit outputting face feature information of a face of the user; and an action recognition detection unit outputting action feature information of at least one among a signature, an input pattern, and a gesture of the user.

9. The system of claim 1, wherein an alternative authentication key including at least one among the private key and the public key is a hash random number and is provided in a form of a QR code.

10. A method for providing personal information utilizing a one-time private key based on a blockchain of proof of use, the method comprising:

a user-authentication and terminal-authentication process in which in response to a service use request to a service provider server, the service provider server transmits a request for the personal information to a user terminal, a blockchain alternative authentication server receives one-time private key issue request information including user-authentication information and terminal identification information from the user terminal storing alternative authentication keys including a public key and a private key, performs user authentication and terminal authentication, and provides a result thereof to the user terminal;

a one-time private key issue request reception process in which when the user authentication and the terminal authentication succeed, the blockchain alternative authentication server receives the one-time private key issue request information including the alternative authentication keys including the public key and the private key from the user terminal;

a one-time private key provision process in which when the blockchain alternative authentication server receives the one-time private key issue request information from the user terminal, the blockchain alternative authentication server generates a first one-time private key and a second one-time private key in a pair, transmits the first one-time private key to the service provider server, and provides a service-providing node server in a blockchain network having a personal information transaction statement for a user of the user terminal with the second one-time private key on the basis of a node transmission log including service provider information for the service-providing node server storing the personal information transaction statement for the user of the user terminal;

a personal information request process in which the service provider server receives the first one-time private key, and transmits personal information provision request information including the first one-time private key to the service-providing node server in the blockchain network;

a personal information provision process in which the service-providing node server performs authentication on whether the second one-time private key received from the blockchain alternative authentication server and the first one-time private key of the personal information provision request information transmitted by the service provider server are in a pair, and when authentication succeeds, the service-providing node server decrypts the personal information transaction statement for the user terminal of the personal information provision request information with the second one-time private key, generates a personal information submission including the personal information including information on a required personal information field required by the service provider server, and provides the personal information submission to the service provider server; and a service provision process in which the service provider server receives the personal information submission for the user terminal from the service-providing node server, acquires the personal information including the required personal information field, and provides a service to the user terminal.

11. The method of claim 10, further comprising:

an alternative authentication service registration process in which the blockchain alternative authentication server is configured to receive blockchain alternative authentication service registration request information from the user terminal, make a request to the user terminal for user-identification personal information, perform user identification through a user-identification institution server when the user-identification personal information is received, acquire the user-authentication information and the terminal identification information from the user terminal when user identification succeeds, perform user authentication and terminal authentication, generate the alternative authentication keys including the public key and the private key when authentication succeeds, provide the alternative authentication keys to the user terminal for storage, and register the user terminal for a blockchain alternative authentication service.

12. The method of claim 11, wherein the alternative authentication service registration process comprises:

a service registration request step in which the user terminal accesses the blockchain alternative authentication server and transmits the blockchain alternative authentication service registration request information to the blockchain alternative authentication service for registration;

a user-identification step in which when a blockchain alternative authentication service registration request is made from the user terminal, the blockchain alternative authentication server acquires the user-identification personal information from the user terminal, makes a request to the user-identification institution server for user identification, and acquires a user-identification result value;

a user-authentication information request step in which after user identification, the blockchain alternative authentication server makes a request to the user terminal for registration of the user-authentication information;

a user-authentication information provision step in which when the request for the user-authentication information is made from the blockchain alternative authentication server, the user terminal acquires the user-authentication information from the user and transmits the user-authentication information to the blockchain alternative authentication server;

an alternative authentication key provision step in which the blockchain alternative authentication server generates the alternative authentication keys including the private key and the public key by applying the user-identification result value and any one or more among the registered user-authentication information and a token variable value, and provides the alternative authentication keys to the user terminal;

a personal information acquisition step in which the blockchain alternative authentication server acquires the personal information from the user terminal;

a personal information transaction statement registration step in which when the personal information is acquired, the blockchain alternative authentication server is configured to select multiple nodes in which the personal information is to be stored among nodes in the blockchain network, generate the personal information transaction statement including the personal information and encrypt the personal information transaction statement with the public key, store the personal information transaction statement and the public key in the service-providing node servers for the selected nodes in a distributed manner, and generate and store node transmission log information including information on the nodes storing blocks; and a block update chain step in which the blockchain alternative authentication server performs proof of use on a fact confirmation certificate for the registered personal information transaction statement, generates new blocks, and applies a chain code hash random number to form an update chain for existing blocks stored in all the nodes.

13. The method of claim 12, wherein the alternative authentication service registration process further comprises:

a user information deletion step in which the blockchain alternative authentication server is configured to issue the generated alternative authentication keys including the public key and the private key, and the personal information transaction statement to the user terminal, transmit the generated personal information transaction statement to the selected service-providing node servers for distributed storage, and delete the personal information transaction statement.

14. The method of claim 12, wherein when selecting the nodes to store blocks including the personal information transaction statement, the blockchain alternative authentication server randomly selects the nodes of which the number ranges from two to 50% of the total number of the nodes in the blockchain network.

15. The method of claim 12, wherein the user-authentication and terminal-authentication process comprises:

a service use request step in which the user terminal accesses the service provider server and transmits service use request information including the public key;

a personal information input request step in which the service provider server transmits, to the user terminal, personal information input request information including required personal information field information and the service provider information including service provider identification information, an encryption key, and a reply address;

a user-authentication request step in which the user terminal acquires the user-authentication information when the personal information input request information is received, and transmits the acquired user-authentication information and the terminal identification information to the blockchain alternative authentication server to request user authentication; and a user-authentication and terminal-authentication performance step in which the blockchain alternative authentication server performs user authentication and terminal authentication with the user-authentication information and the terminal identification information.

16. The method of claim 12, wherein the personal information provision process comprises:

a one-time private key reception step in which the service-providing node server in the blockchain network receives the second one-time private key and a personal information request statement including the public key, the service provider information, required personal information field information, and one-time private key pair authentication information from the blockchain alternative authentication server, and receives the first one-time private key and the service provider information including service provider identification information of a service provider, an encryption key, and a reply address from the service provider server;

a service provider identification information verification step in which it is verified whether pieces of the service provider identification information of the service provider are matched, on the basis of the received service provider information and the personal information request statement;

a personal information transaction statement detection step in which when verification of the service provider identification information succeeds, the personal information transaction statement matched to the public key is detected;

an authentication step in which against the one-time private key pair authentication information, authentication is performed on whether the first one-time private key and the second one-time private key are in a pair, and when pair authentication succeeds, the second one-time private key is activated to be used as the one-time private key;

a personal information transaction statement decryption step in which the personal information transaction statement for the user terminal is decrypted with the authenticated one-time private key; and a personal information provision step in which the personal information corresponding to the required personal information field information is extracted from the decrypted personal information transaction statement, the personal information submission including the extracted personal information corresponding to the personal information field is generated, an electronic signature of the service provider server is added, encryption is performed with the encryption key of the service provider, and a result of encryption is provided to the service provider server corresponding to the service provider identification information.

17. The method of claim 12, further comprising:

an update process in which when the service provider server is the service-providing node server belonging to the blockchain network and the service-providing node server identifies occurrence of change of the personal information including sensitive personal information as the service for the user of the user terminal is provided, the service-providing node server generates a personal information submission document including both the personal information including the sensitive personal information to be changed and an electronic signature of the service-providing node server, and makes a reply to the service-providing node server that has provided the personal information, so that the personal information for the user of the user terminal is updated.

18. The method of claim 17, wherein the update process comprises:

a monitoring step in which the service-providing node server monitors whether the personal information including the sensitive personal information to be changed as the service for the user of the user terminal is provided is generated;

an update agreement inquiry step in which the service-providing node server transmits change-details-informing and agreement inquiry information to the user terminal in order to inform of a record of details of change of the personal information including the sensitive personal information to be changed and to inquire about agreement on update storage, thereby inquiring about agreement on update;

a personal information submission document generation step in which when an update agreement signal is received from the user terminal, the service-providing node server generates the personal information submission document including the public key and the electronic signature of the service-providing node server with respect to the personal information including the sensitive personal information to be changed;

a first one-time private key provision step in which when an agreement signal is received from the user terminal, the service-providing node server makes a request to the user terminal for the one-time private key, receives the first one-time private key from the user terminal, and transmits the first one-time private key to the service-providing node server that has provided the personal information; and an update request step in which the service-providing node server encrypts the generated personal information submission document with an encryption key of the service-providing node server that has provided the personal information, and transmits personal information change request information with the first one-time private key to a reply address of the service-providing node server that has provided the personal information.

19. The method of claim 18, wherein the update process further comprises:
   a one-time private key request step in which to update the detected personal information transaction statement matched to a user public key, the service-providing node server that has requested the personal information transmits, to the user terminal, one-time private key issue request information for making a request to the user terminal for the one-time private key one more time in order to decrypt the personal information transaction statement encrypted with the user public key;
   a one-time public key provision step in which in response to a one-time private key issue request from the service-providing node server, when the one-time private key issue request information is received from the user terminal, the blockchain alternative authentication server generates the first one-time private key and the second one-time private key that are a one-time private key pair, provides the first one-time private key to the service-providing node server, and transmits the second one-time private key to the service-providing node server that has provided the personal information; and
   an update step in which the service-providing node server that has provided the personal information is configured to
   perform pair authentication on the received first one-time private key and the received second one-time private key,
   decrypt the personal information transaction statement,
   apply personal information change details included in the personal information submission document to an original text for change processing and storage, and
   generate a detailed statement of use to provide the same to the blockchain alternative authentication server.

* * * * *